(12) United States Patent
Butler et al.

(10) Patent No.: US 7,092,337 B2
(45) Date of Patent: Aug. 15, 2006

(54) INTEGRATED DISC INSPECTION AND REPAIR APPARATUS AND APPERTAINING METHOD

(76) Inventors: Brian F. Butler, 4427 N. Damen, Chicago, IL (US) 60625; Brandon M. Dachel, 1904 Oaktree Ct., Lake Villa, IL (US) 60046; John S. Little, 749 Hunter Rd., Glen View, IL (US) 60025; Silvano Romeo, 9464 W. Maple Dr. #2B, Rosemont, IL (US) 60018; John Meyer, 330 Brampton Ct., Lake Forest, IL (US) 60045

( * ) Notice: Subject to any disclaimer, the term of this patent is extended or adjusted under 35 U.S.C. 154(b) by 607 days.

(21) Appl. No.: 10/315,726

(22) Filed: Dec. 10, 2002

(65) Prior Publication Data

US 2003/0152001 A1    Aug. 14, 2003

Related U.S. Application Data

(60) Provisional application No. 60/338,940, filed on Dec. 10, 2001.

(51) Int. Cl.
*G11B 7/00*    (2006.01)

(52) U.S. Cl. .................. 369/53.22; 369/100; 369/72
(58) Field of Classification Search .............. 369/72, 369/53.1, 53.22, 100
See application file for complete search history.

(56) References Cited

U.S. PATENT DOCUMENTS

| | | |
|---|---|---|
| 4,783,870 A | 11/1988 | Yeung |
| 5,069,236 A | 12/1991 | Pierson |
| 5,126,992 A | 6/1992 | Lavinsky et al. |
| 5,524,313 A | 6/1996 | Sato |
| 5,537,706 A | 7/1996 | Baker |
| 6,011,618 A * | 1/2000 | Iwata et al. .............. 356/237.2 |
| 6,424,611 B1 | 7/2002 | Quilling et al. |

\* cited by examiner

*Primary Examiner*—Nabil Hindi
(74) *Attorney, Agent, or Firm*—Schiff Hardin LLP

(57) ABSTRACT

The invention provides a disc inspection and rejuvenation/repair system. The inspection system and rejuvenation/repair system may be provided as separate modules or may be combined in an integrated unit. The integrated unit may be manually operated, or may be an automated system comprising a controller and disk handling system Appertaining methods of operating the system and modules are also provided.

37 Claims, 23 Drawing Sheets

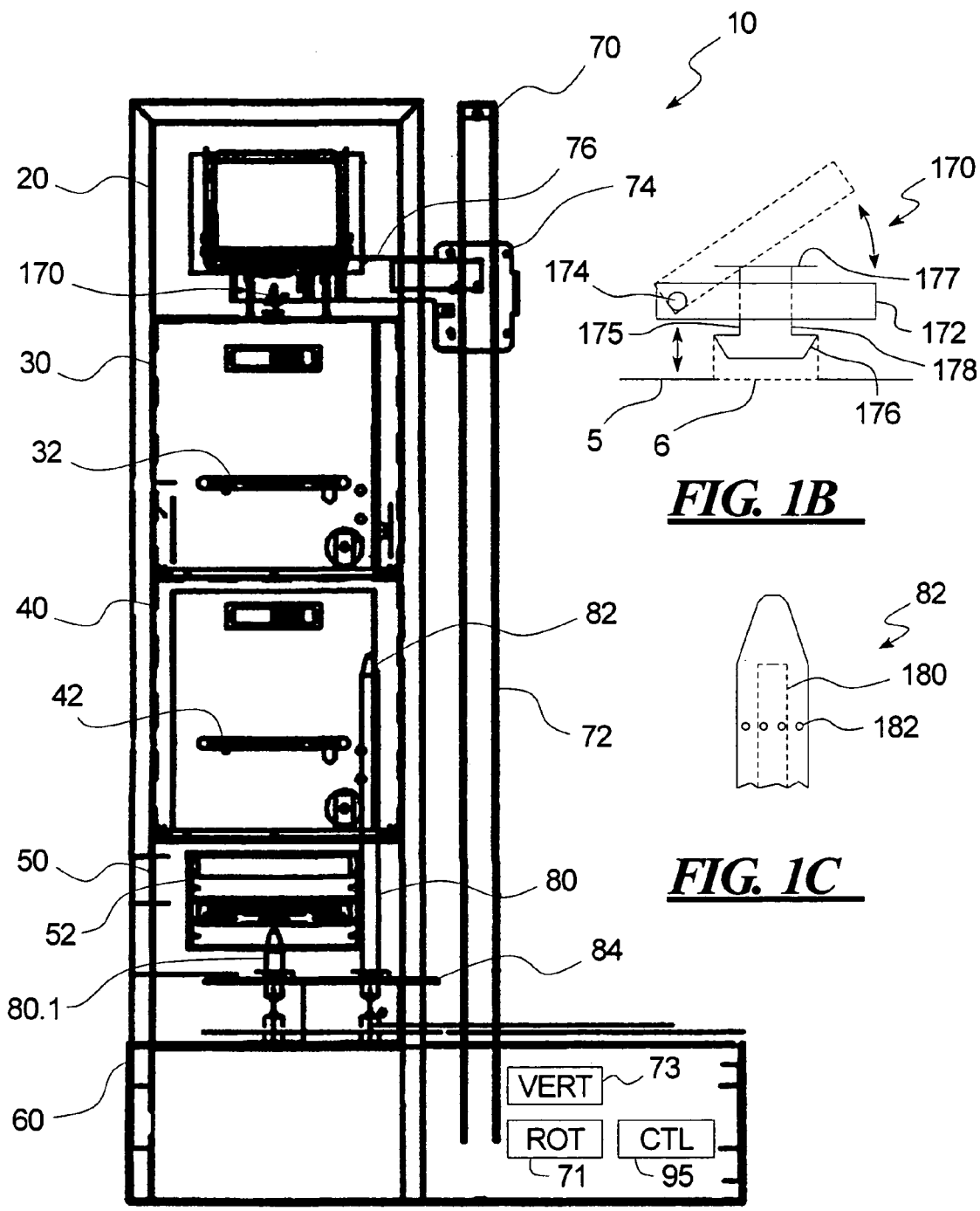

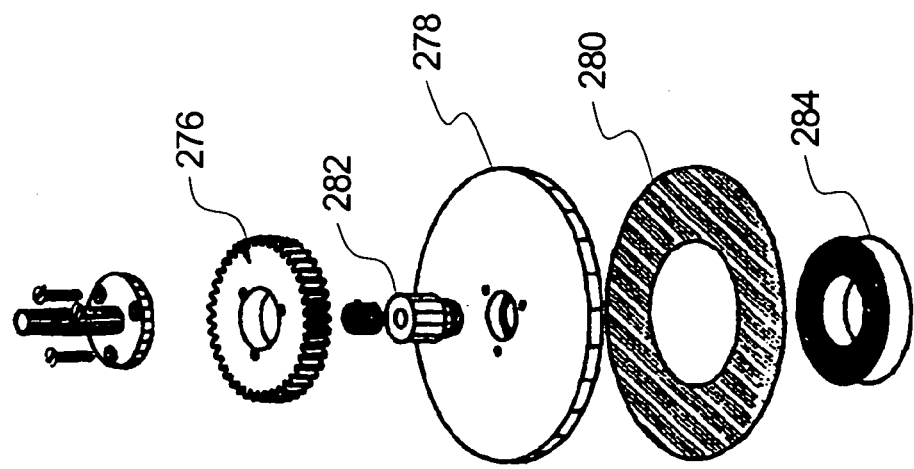
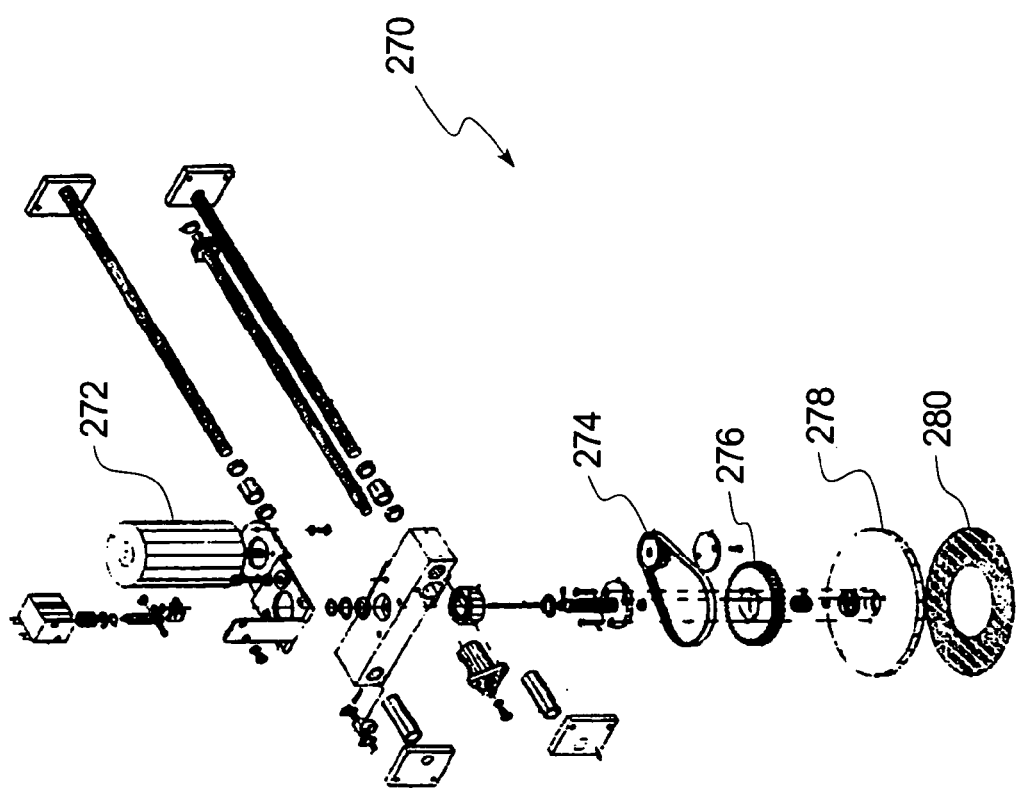

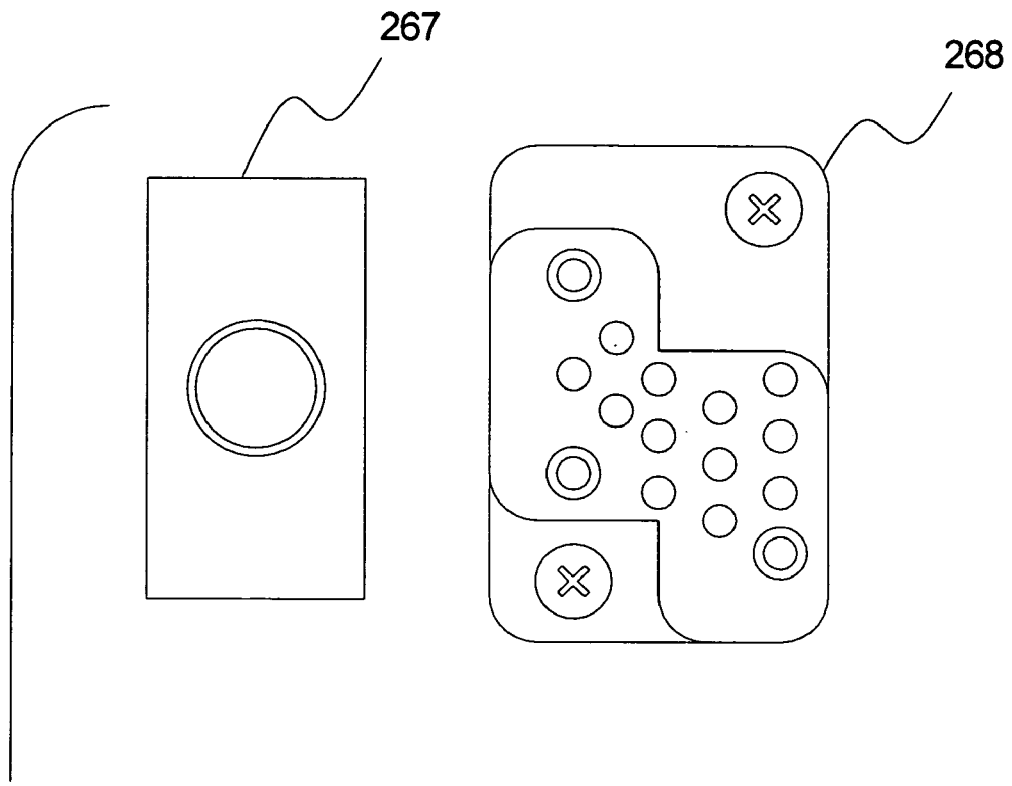
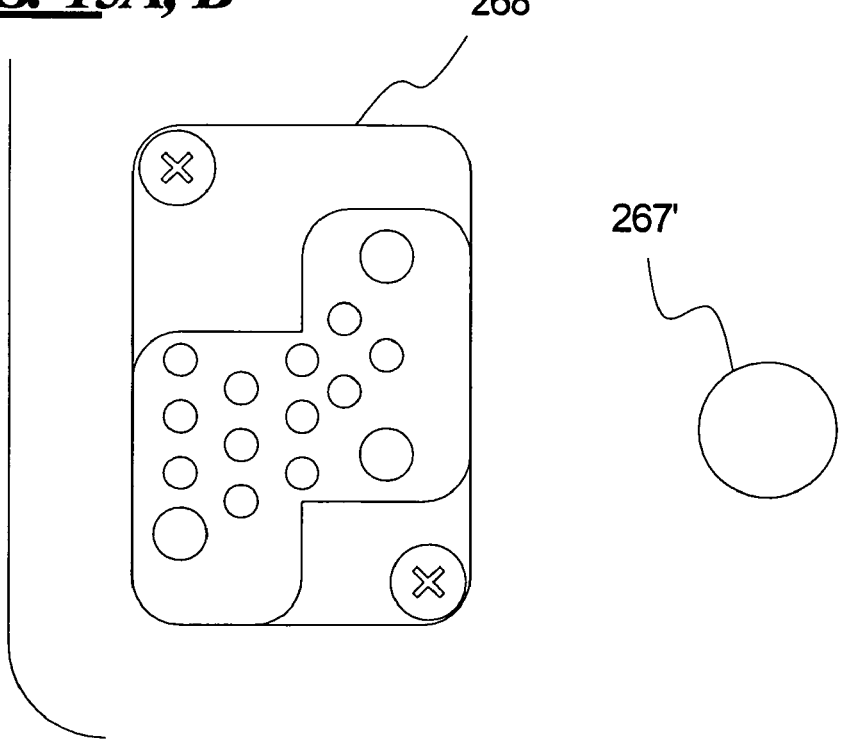
FIGS. 15A, B

INTEGRATED DISC INSPECTION AND REPAIR APPARATUS AND APPERTAINING METHOD

RELATED APPLICATIONS

The present application claims the benefit of Provisional Application Ser. No. 60/338,940 filed on Dec. 10, 2001.

BACKGROUND OF THE INVENTION

1. Field of the Invention

The invention relates to an integrated system having one or more inspection stations that are used to inspect, and one or more repair stations that are used to repair discs that may be damaged. This integrated system may be manually operated or automated. The invention also relates to a method for using the integrated system. An inventive repair module is provided as is an inventive inspection system.

2. Description of the Related Art

The polysilicon-based layered disc is one of the most popular data storage devices for various applications including computer, audio, video, entertainment, and other applications. These discs comprise grooves/pits and bumps that represent the digital 0's and 1's of binary data.

As these discs are subjected to everyday use, they develop scratches, blemishes, and dirt/dust accumulations that may prevent them from being accessed properly. Numerous approaches to cleaning and removing scratches and blemishes have been developed, including those used to clean and repair multiple discs.

For example, U.S. Pat. No. 4,783,870 discloses a disc cleaner having a disc and cleaning pad that rotate at approximately the same speed. U.S. Pat. No. 5,069,236 discloses a disc cleaning device for cleaning multiple disks by providing a retaining cradle and having a spray bar that sprays fluid on the disks and projects through the centers of the disks. Use of centrifugal force for carrying cleaning solution across the face of a disc is disclosed by U.S. Pat. No. 5,126,992. U.S. Pat. No. 5,524,313 discloses the removal of flaws from a disc by using a rotary member having a cylindrical peripheral fact that is resiliently contacted with the surface of the disc. U.S. Pat. No. 5,537,706 discloses a multi-disk cleaning system having multiple circular apertures and multiple cleaning pads that allow multiple disks to be simultaneously cleaned. Finally, U.S. Pat. No. 6,424,611 discloses a system having an inspection station that examines a disk under a high intensity light by use of a magnifying glass, and a cleaning system that uses reciprocating cleaning cloths on the top and bottom of a disc simultaneously. However, none of these patents disclose an inspection station, cleaning station, or combined inspection and rejuvenation station according to the present invention.

SUMMARY OF THE INVENTION

The present invention is directed to a disc rejuvenation station, a disk inspection station, a manually operated combined inspection and rejuvenation station, and an automated combined inspection and rejuvenation station, as well as appertaining methods for operating these systems.

The invention includes an optical disc inspection system, comprising:
an inspection station having a drive input tray to receive a disc to be inspected, the inspection station being configured to check a track integrity and the track being chosen by a predetermined criterion, the inspection station being configured to determine a type of disc and make an appropriate inspection that is dependent on the type of disc;
a user display for displaying a status of an inspection operation on the disc performed by the inspection station;
a user input device for entering parameters for the inspection station and controlling the inspection station; and
a main controller that is connected to the inspection station, the user display, and the user input device that controls the inspection operation, the main controller being configured to provide some indication of results of an inspection.

The invention also includes a method for inspecting an optical disc, comprising:
entering process parameters and criteria at an input device;
storing process parameters in a main controller;
inserting a disc into an inspection station;
reading a disc cylinder according to a criteria;
determining if a fault is detected;
if a fault is detected, then
 if a criteria is exceeded based on the detected fault, then removing the disc from the inspection station as a bad disc;
 if a criteria is not exceeded, then incrementing a fault count and continuing the method;
determine if all cylinders determined by the criteria have been read; if all cylinders have been read, then removing the disc from the inspection station as a good disc; and
if all cylinders have not been read, then repeating the method steps of reading a disc, determining if a fault is detected, and determining if all cylinders have been read.

The invention further includes an optical disc repair system, comprising
at least one repair station that comprises:
a repair station input tray for inserting a disc into the repair station;
a disc holding assembly for securely holding the disc during a repair operation;
a disc movement motor that moves the disc in the disc holding assembly in a position for the repair operation;
a rotating brush that contacts the disc during the repair operation;
a fluid pump that delivers fluid to the rotating brush prior to or during the repair operation; and
a repair station controller that controls the repair station input tray, the disc holding assembly, the disc movement motor, the rotating brush, and the fluid pump.

The invention includes a method for repairing a damaged optical disc, comprising:
providing a predetermined criteria for repair to a repair station controller;
inserting a disc into a station input tray;
closing the station input tray;
mounting the disc on a disc holding assembly using the station controller;
moving the disc holding assembly into a position for a repair operation using the station controller;
rotating a brush that is in contact with the disc during the repair operation, and rotating the disc as well, where the speed of rotation of the brush and the disc is controlled by the station controller using the predetermined criteria;

providing a fluid to the brush before or during the repair operation;

moving the rotating brush over the disc during the repair operation along an axis that is parallel to the disc radius in a back and forth manner;

ending the repair operation by the station controller based on the predetermined criteria;

moving the disc holding assembly into the station input tray;

extending the station input tray; and removing the disc from the station input tray.

The invention also includes a method for repairing a damaged optical disc, comprising:

providing a polish station predetermined criteria for inspection to a polish station controller;

inserting a disc into a polish station input tray;

closing the polish station input tray;

mounting the disc on a polish station disc holding assembly using the polish station controller;

moving the polish station disc holding assembly into a position for a polishing operation using the polish station controller;

rotating a polish station brush that is in contact with the disc during the polishing operation, and rotating the disc as well, where the speed of rotation of the polish station brush and the disc is controlled by the polish station controller using the polish station predetermined criteria;

providing a fluid to the polish station brush before or during the polishing operation;

moving the rotating brush over the disc during the polishing operation along an axis that is parallel to the disc radius in a back and forth manner;

ending the polishing operation by the station controller based on the polish station predetermined criteria;

moving the polish station disc holding assembly into the polish station input tray;

extending the polish station input tray;

removing the disc from the polish station input tray;

providing a rejuvenate station predetermined criteria for inspection to a rejuvenate station controller;

inserting a disc into a rejuvenate station input tray;

closing the rejuvenate station input tray;

mounting the disc on a rejuvenate station disc holding assembly using the rejuvenate station controller;

moving the rejuvenate station disc holding assembly into a position for a rejuvenating operation using the rejuvenate station controller;

rotating a rejuvenate station brush that is in contact with the disc during the rejuvenating operation, and rotating the disc as well, where the speed of rotation of the rejuvenate station brush and the disc is controlled by the rejuvenate station controller using the rejuvenate station predetermined criteria;

providing a fluid to the rejuvenate station brush before or during the rejuvenating operation;

moving the rotating brush over the disc during the rejuvenating operation along an axis that is parallel to the disc radius in a back and forth manner;

ending the rejuvenating operation by the station controller based on the rejuvenate station predetermined criteria;

moving the rejuvenate station disc holding assembly into the rejuvenate station input tray;

extending the rejuvenate station input tray; and removing the disc from the rejuvenate station input tray.

The invention also includes an integrated optical disc inspection and repair system, comprising:

a main controller;

a user display connected to the main controller for displaying status information;

a user input device connected to the main controller for entering information including system configuration variables into the main controller;

an inspection system having a disc inspection station that is configured to determine if a disc requires repair according to a predefined criteria from the main controller, providing a disc inspection status on the user display; and repair system having a repair station attached to the inspection station that receives a disc requiring repair and is configured to perform a repair operation on the disc requiring repair.

The invention also includes an optical disc integrated inspection and repair system, comprising:

a main controller;

a user display connected to the main controller for displaying status information;

a user input device connected to the main controller for entering information including system configuration variables into the main controller;

an inspection system having a disc inspection station that has a drive input tray to receive a disc to be inspected, the inspection station being configured to check a track integrity and the track being chosen by a predetermined criterion, the inspection station being configured to determine a type of disc and make an appropriate inspection that is dependent on the type of disc, and the inspection system being connected with the main controller for receiving the predetermined inspection criterion and to provide some indication of results of an inspection; and a repair system, comprising at least one repair station that comprises:

a repair station input tray for inserting a disc into the repair station;

a disc holding assembly for securely holding the disc during a repair operation;

a disc movement motor that moves the disc in the disc holding assembly in a position for the repair operation;

a rotating brush that contacts the disc during the repair operation;

a fluid pump that delivers fluid to the rotating brush prior to or during the repair operation; and a repair station controller that controls the repair station input tray, the disc holding assembly, the disc movement motor, the rotating brush, and the fluid pump.

The invention further includes a method for inspecting and repairing an optical disc, comprising:

combining an inspection system and a repair system into a single unit;

performing an inspection on a disc and providing an indicator of whether the disc requires repair with the inspection system;

performing a repair on a disc determined to require repair using the repair system.

Finally, the invention also includes a method for inspecting and repairing an optical disc, comprising:

entering process parameters and criteria at an input device;

storing process parameters in a main controller;

inserting a disc into an inspection station;

reading a disc cylinder according to a criteria;

determining if a fault is detected;

if a fault is detected, then
  if a criteria is exceeded based on the detected fault, then removing the disc from the inspection station as a bad disc;
  if the criteria is not exceeded, then incrementing a fault count and continuing the method;
determining if all cylinders determined by the criteria have been read;
if all cylinders have been read, the removing the disc from the inspection station as a good disc; and
if all cylinders have not been read, then repeating the method steps of reading a disc, determining if a fault is detected, and determining if all cylinders have been read;
repairing a bad disc according to the following:
providing a predetermined criteria for repair to a repair station controller;
inserting the disc into a station input tray;
closing the station input tray;
mounting the disc on a disc holding assembly using the station controller;
moving the disc holding assembly into a position for a repair operation using the station controller;
rotating a brush that is in contact with the disc during the repair operation, and rotating the disc as well, where the speed of rotation of the brush and the disc is controlled by the station controller using the predetermined criteria;
providing a fluid to the brush before or during the repair operation;
moving the rotating brush over the disc during the repair operation along an axis that is parallel to the disc radius in a back and forth manner;
ending the repair operation by the station controller based on the predetermined criteria;
moving the disc holding assembly into the station input tray;
extending the station input tray; and
removing the disc from the station input tray.

DESCRIPTION OF THE FIGURES

The invention is described in further detail below with reference to the following drawings.

FIG. 1A is a front view of an exemplary embodiment of the inventive integrated disc inspection and repair system;

FIG. 1B is a side view of the inventive disc centering mechanism;

FIG. 1C is a side view of one embodiment of an inventive disc spindle comprising air holes;

FIG. 12 is an exploded view of the components in and exemplary repair module showing the movement mechanism for the disc holding assembly;

FIG. 13 is an exploded view showing the components of the disc holding assembly itself;

FIGS. 15A, B are views of the mating fluid and electrical connectors;

DETAILED DESCRIPTION OF THE INVENTION

Figure 1D:
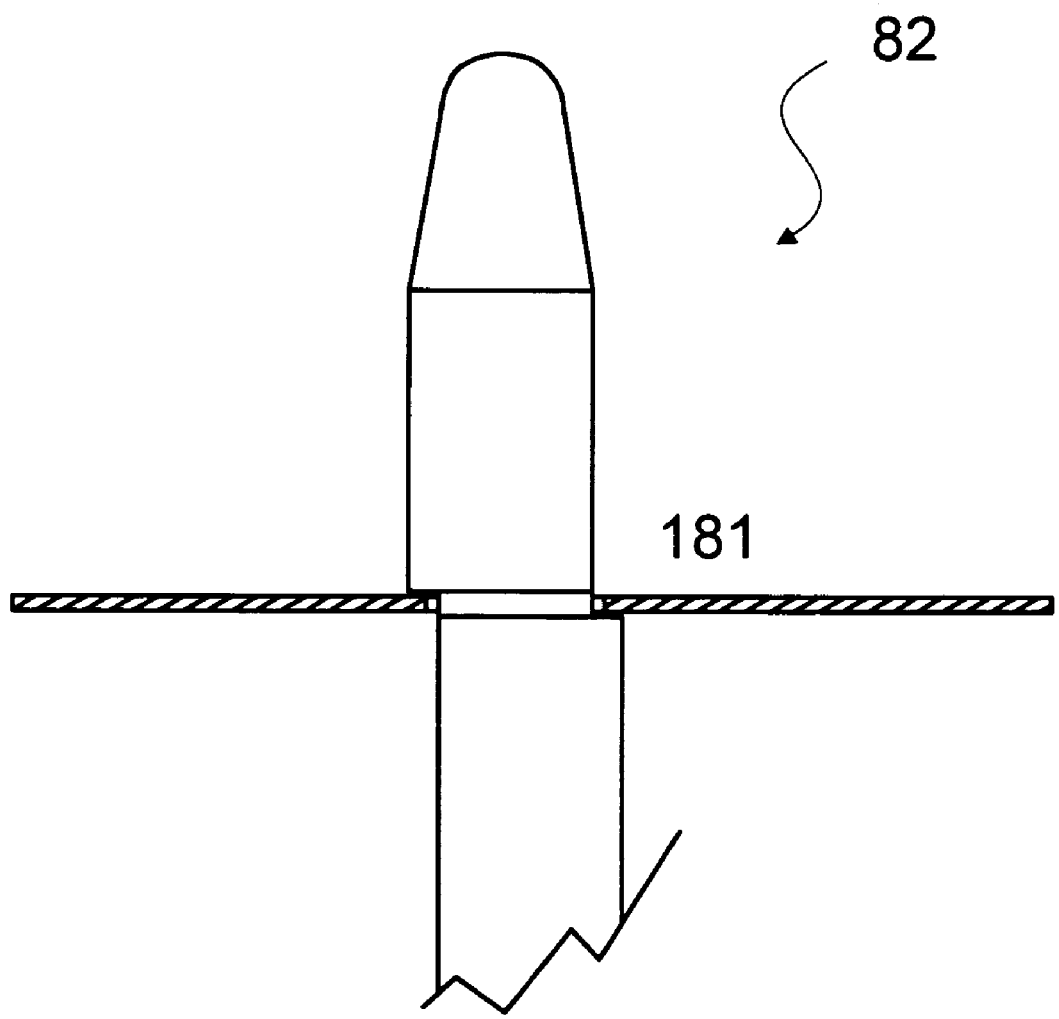
FIG. 1D is a side view of an alternate embodiment of an inventive disc spindle comprising an offset.

In a broad overview, the invention comprises various systems (FIG. 25, 200, 300, 400), and methods of operating these systems, for the inspection and rejuvenation/repair of discs. According to various aspects of the invention, an inspection system 200, a repair system 300, and a disc handling system 400 are provided. These systems may be standalone systems (e.g., standalone inspection system 110, FIG. 8; standalone repair system: polish station 30 and/or rejuvenation station 40) or integrated systems (e.g., 10, FIG. 1A); the integration may take into account any combination of these elements. The inspection system 200 is used to obtain information about a disc (including the playability of the disc), the repair system 300 is used for correcting certain types of problems with discs (when possible), and the disc handling system 400 is used for automatically moving and storing discs in the system.

The primary embodiments of the invention are: 1) the standalone inspection system 110 (200), which only comprises the elements associated with inspection; 2) the standalone repair system 130, which comprises only those elements associated with disc repair; 3) the integrated manual inspection and repair system 120, which combines the inspection system 200 and the repair system 300; and 4) the integrated automated inspection and repair system 10, which combines the inspection system 200, the repair system 300, and the disc handling system 400, which may be an automated or robotic system.

Inspection System

Figure 8:
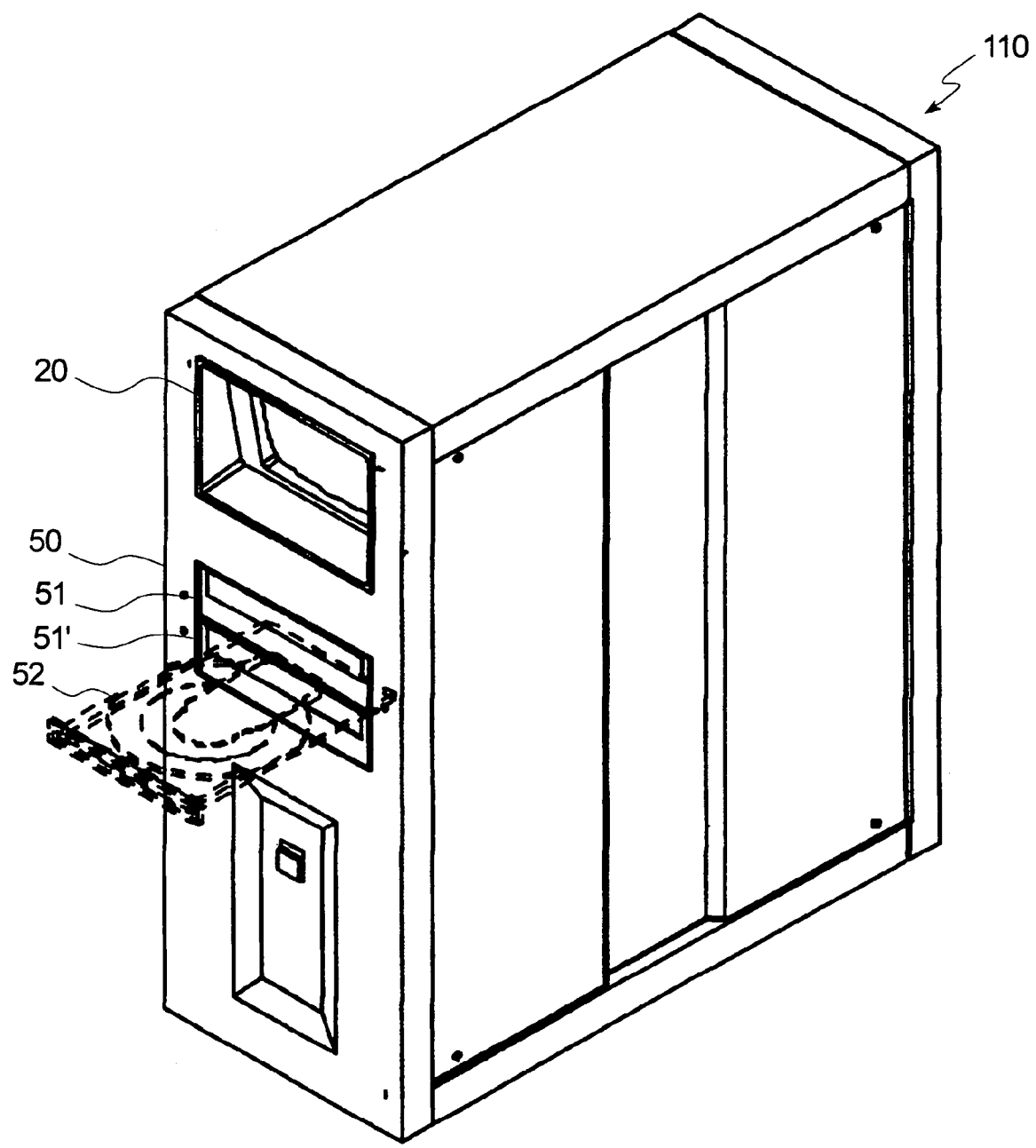
FIG. 8 is an isometric view of an inventive standalone inspection station.
Figure 9:
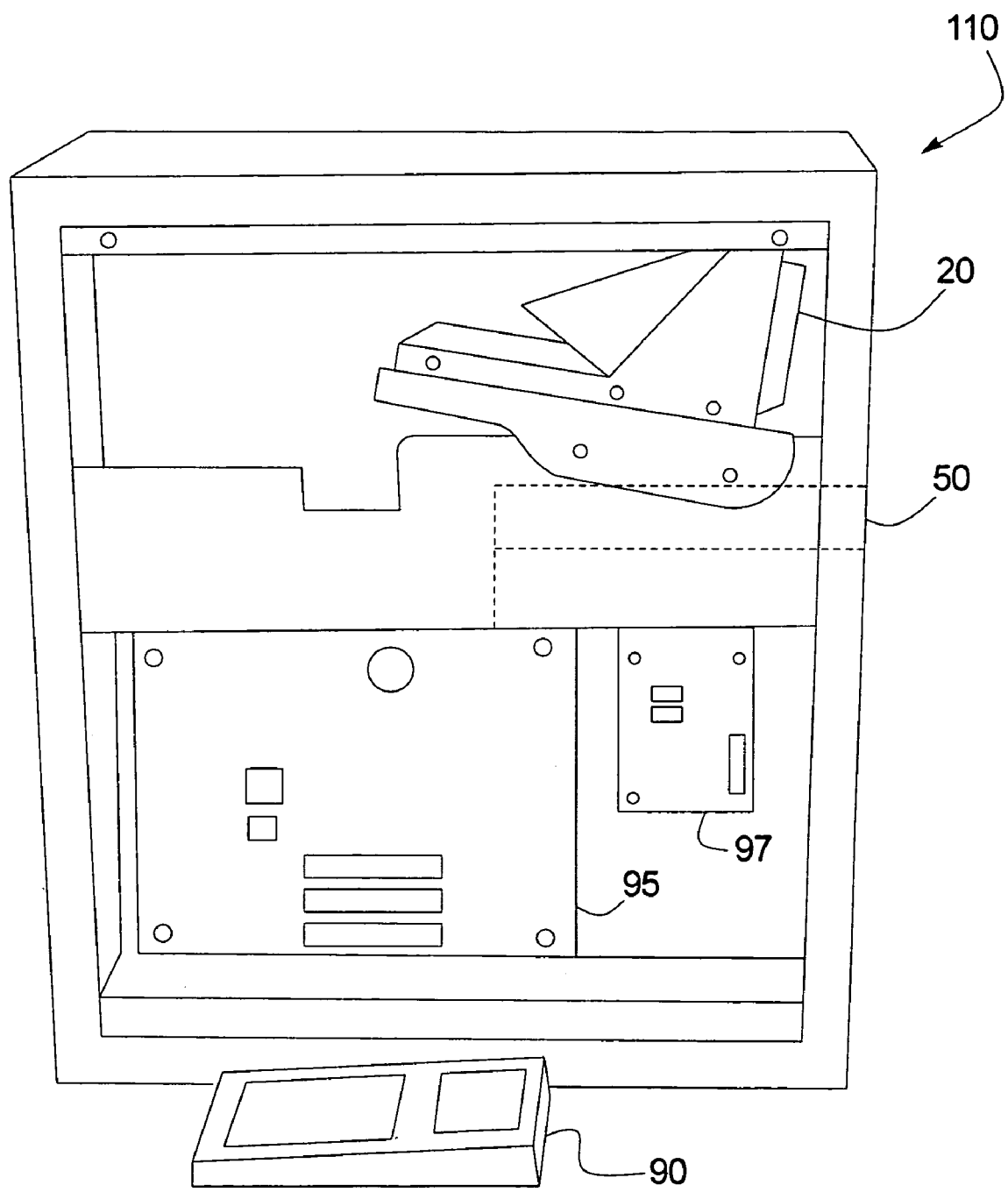
FIG. 9 is an isometric view of the standalone inspection station with the cover removed.

The inventive inspection system 200 is provided, where FIGS. 8 and 9 illustrate a standalone inspection system 110. The discussion below, however, is generalizable to both a standalone version and an integrated version. The inspection station has a user display 20 which is used to provide information to the user, an optional user input device 90 (FIG. 9), an inspection station 50 having one or more inspection disc drives 51, 51' that each have an inspection drive input tray 52 at which a disc is loaded for inspection.

The inspection system 200 is controlled by a main controller 95; this main controller 95 may be shared among multiple systems in the invention, however. This main controller is preferably an Intel Celeron or Pentium™-based IBM PC-compatible board (such as the Intel 815 motherboard with Celeron processor and 16, or more, Megabytes of computer RAM, a floppy disc and/or IDE RAM module wired in standard PC computer fashion. This system could also use a VGA video monitor and 21 key keyboard, although a full 106 key keyboard could be used), but any suitable computer-based controller can be used. In a preferred embodiment, an optional security or encryption board 97 is provided and associated with the main controller 95, such that the inventive software cannot be run on the main controller 95 without an indication of validity provided by the security board 97, based on well known technology.

Figure 16:
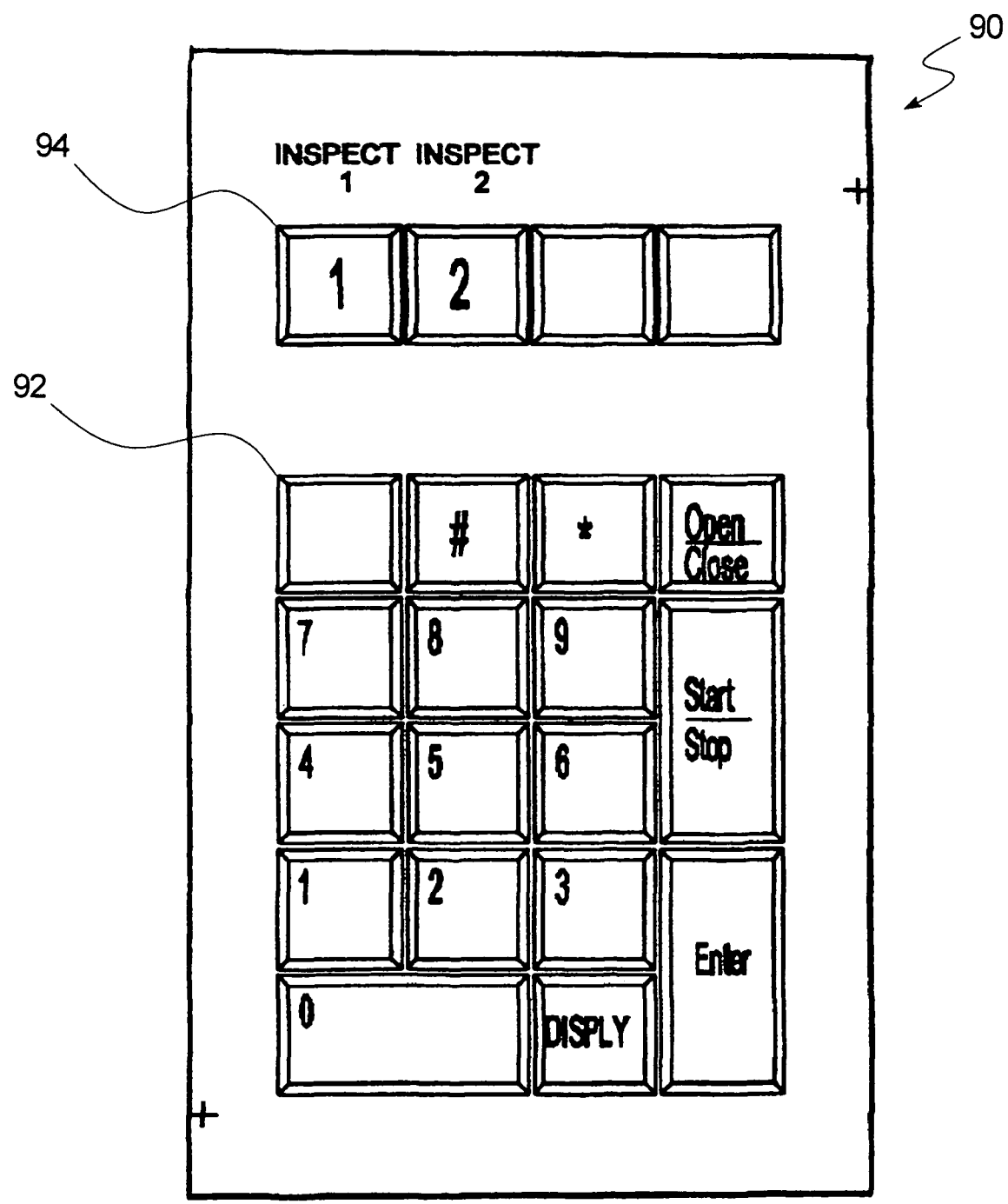
FIG. 16 is a pictorial top view of an exemplary 21-key keyboard user input device.

The optional user input device 90 provided in a preferred embodiment may be a keyboard, mouse, trackball, touchscreen, pointing device, or any other input device capable of entering information, including a communications input device or port that can be connected to another computer (via, e.g., RS-232, USB, Ethernet, etc.). In a preferred embodiment of the invention, a 21-key customized keyboard 90 is provided according to FIG. 16 which illustrates a main numeric keypad 92 and a function keypad 94, which can be used for various operations. In the keyboard 90 illustrated in FIG. 16, a user, for example, can stop and start the system drives using the Stop/Start key. For a system with two inspection stations, the appropriate Inspection Station key on the function keypad 94 is pressed prior to pressing the Start/Stop key (which may be used to invoke the inspection process) or the Open/Close key (which may be used to open/close an inspection drive 51). The keyboard 90 may be provided on a cable so it can be moved for the convenience of a user, e.g., to accommodate right and left handed users. A user input device 90 is optional in the sense that configuration parameters for inspection or other operators may be preloaded into the system when shipped to the user, and the inspection could be initiated upon the insertion of a disc.

The inspection station 50 is configured to subject a disc to a number of procedures in order to determine if it contains a defect (such as one that might interfere with normal playback of video, audio or data) or not. In a preferred embodiment, the inspection station 50 comprises at least one disc drive 51 that is capable of reading any type of disc to be inspected and repaired, including one or more of the following: audio CDs, computer CDs, Entertainment DVD, Data DVD, CD-Rs, DVD-RAMS, game CDs, etc. This drive can be any commercially available brand and model that fully supports the ATAPI protocol, such as the Toshiba model series 1400 or 1500. Although the flexibility to handle a wide variety of discs is beneficial, a limited inspection station 50 that is limited to a particular type of disc(s) is within the scope of the invention.

A user display 20 that could be a CRT or other alphanumeric type display, such as an LCD or plasma variety, provides the user with an indication of the success or failure of the inspection, and may provide additional information about the disc itself. This user display 20 is connected to the main controller 95 and the optional user input device 90 using any standard interface. In the preferred embodiment, the user display 20 is a miniaturized monitor (e.g., Omnivision 5" VGA CRT) such that it can be conveniently integrated with other elements in the inspection system, or other integrated systems.

Figure 27:
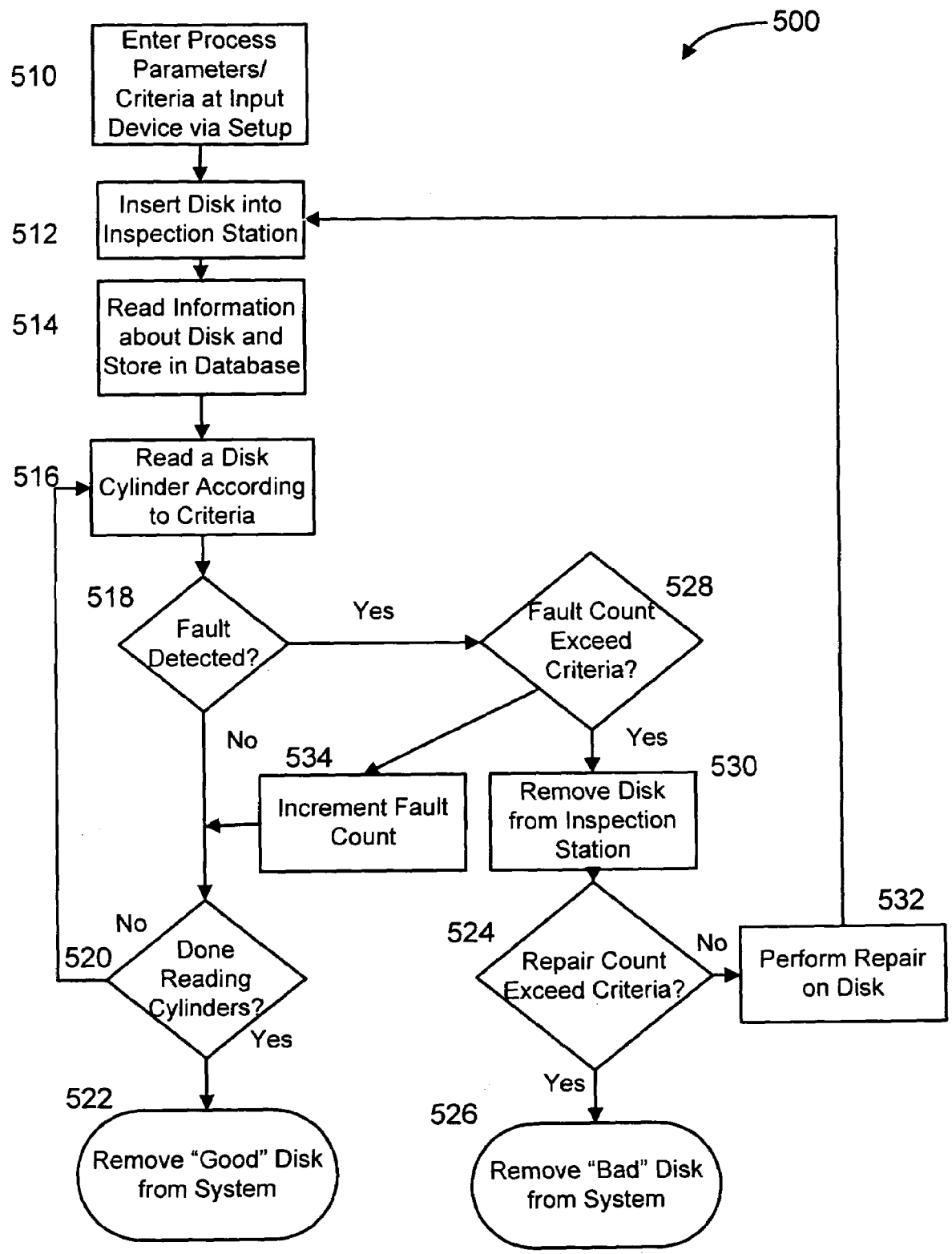
FIG. 27 is a flowchart showing the inventive inspection process.

The inspection process 500 is illustrated by the flowchart of FIG. 27. This process is described both in terms of the flowchart of FIG. 27 and the screen displays shown in FIGS. 17–24. This inventive process is described below by an exemplary procedure and associated display on the user display 20.

Figure 17:
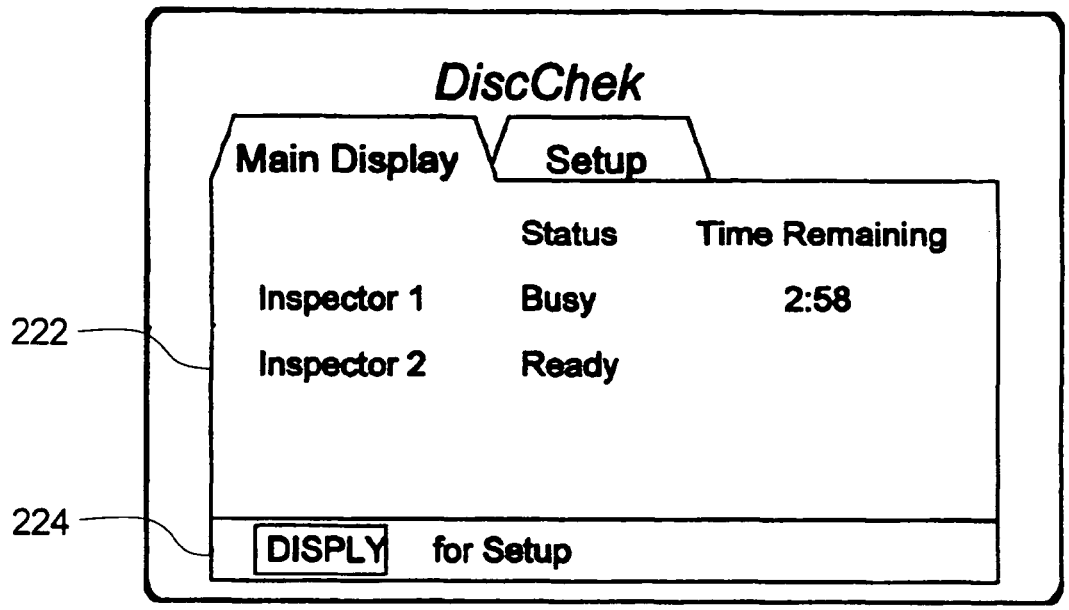
FIGS. 17–24 are screen shots showing the displays for the inventive inspection procedures.
Figure 18:
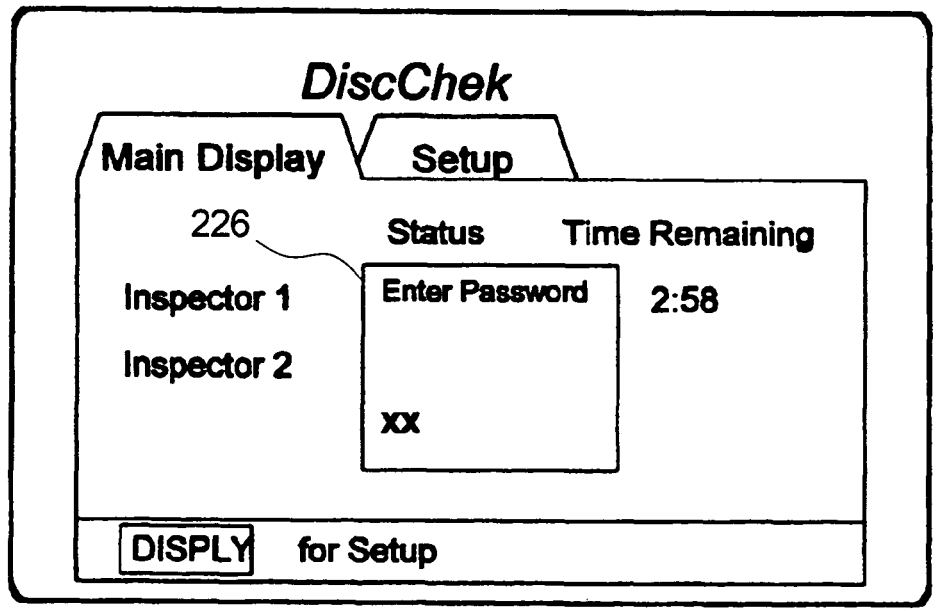

FIG. 17 illustrates an exemplary display of the inspection system. In the preferred embodiment, upon power-up, the main controller 95 checks certain system(s) elements and returns them to their initialized starting status. The main controller monitors certain machine functions, which may include damage detection, displays, and keyboard entries by an operator. In a preferred embodiment, the main controller 95 maintains statistics in memory on how many discs have been inspected are maintained. This allows the user to keep track of disc condition history.

The display comprises three main regions, a tabbed menu 220, a main region 222, and a bottom status region 224. During a normal disc inspection operation, when the Main Display option on the tabbed menu 220 is selected, the main region constantly informs the operator about the status of a disc and the machine The exemplary display shown in FIG. 17 shows the status of two inspectors at one time. It also tells the operator approximately how long it will take to complete the inspection. In order to look at the inspection results of one inspector (or to control the functions of one of the inspectors) the user presses the "Inspect 1" OR "Inspect 2" key on the top row of the keyboard, and presses the DISPLY key to go back to the Main display. This display is not limited to providing information about only two inspection disc drives 51, 51' but can accommodate any number of disc drives 51 in the system.

If configuration/setup settings have been established, the unit is then ready for use after turning on the power. To establish or change the inspection settings, the user chooses the Setup option on the tabbed menu 222, at which point an optional password screen 226 (FIG. 18) may appear. Any known mechanism may be used to enter and check the password, and to permit access to the setup procedures.

Figure 19:
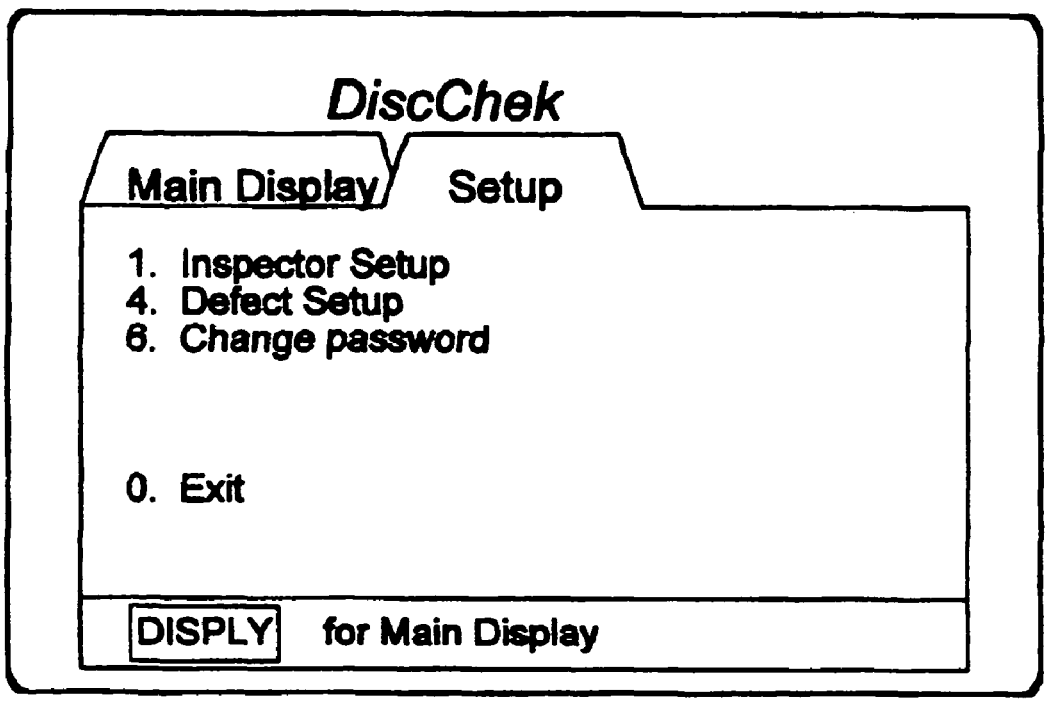
Figure 20:
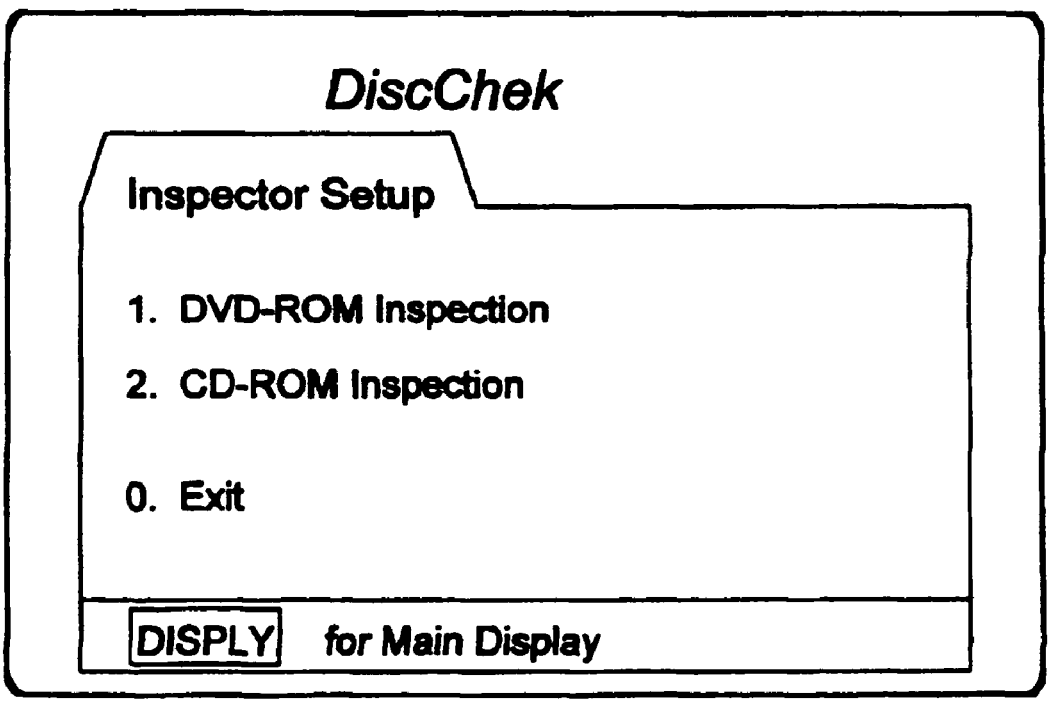
Figure 21:
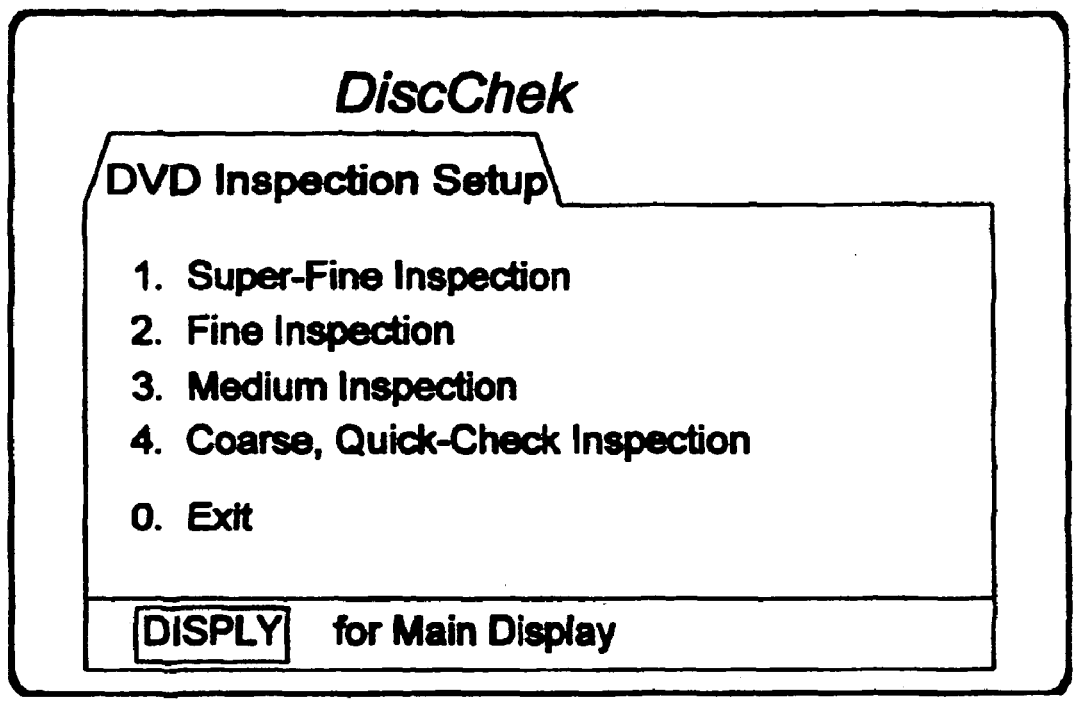
Figure 22:
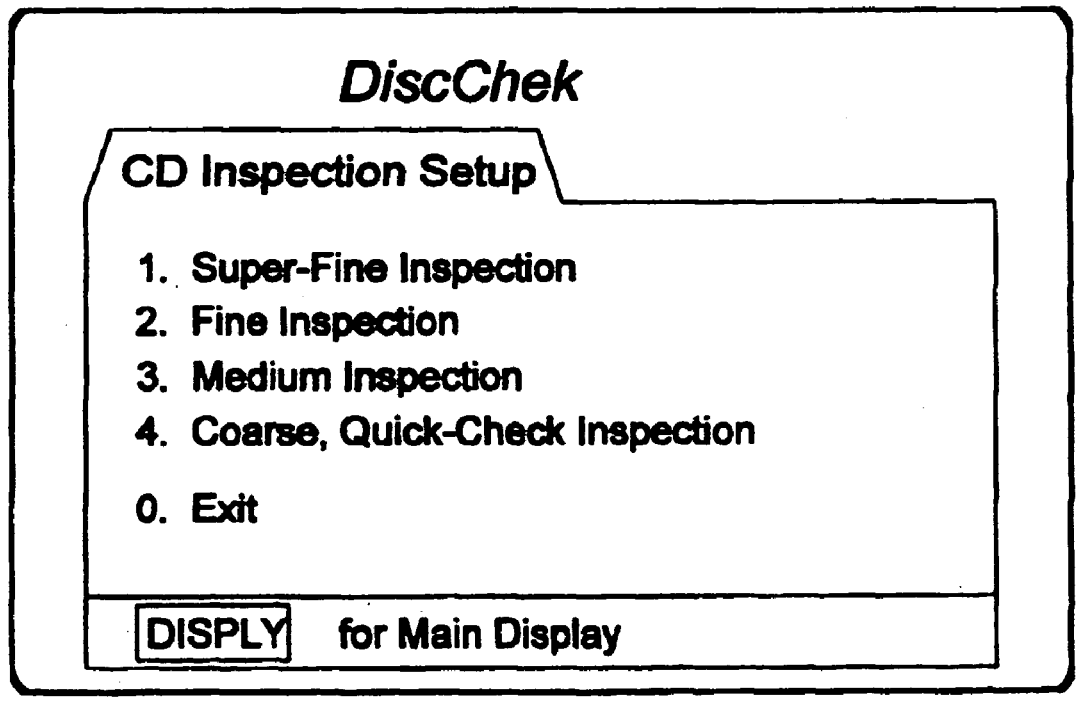

Once the setup mode is entered, various parameters may be entered via the input devices (step 510, FIG. 27). FIG. 19 shows possible setup options that may be provided. When the Inspector Setup is selected, a menu may be provided that permits selection between, for example, a DVD-ROM Inspection and a CD-ROM Inspection (FIG. 20). If the DVD Inspection is selected, FIG. 21 illustrates possible setup parameters, ranging from a Super-Fine Inspection, which checks every single cylinder/track on the disc. This option is generally not recommended for the DVD-ROM, given the data density and the extremely narrow track size and number of tracks. In the Super-Fine inspection mode, each and every track is checked. This is generally not necessary for DVD-ROMs, and even for CD-ROMs, since typical defects, including scratches, tend to cover significantly more than one track.

The DVD Inspection Setup additionally contains varying levels of inspection, which may, for example, be every 50 tracks for the Fine Inspection, 100 tracks for the Medium Inspection, and 200 tracks for the Coarse Inspection. If the CD Inspection is chosen, the same menu options are presented to the user (FIG. 22), however, finer or coarser inspections can be undertaken by the user by the parameters chosen or set by the user, since regular CDs tend to have a much lower density (e.g., the skipped tracks could be 10, 20 and 50 respectively). Furthermore, the default parameters between these two types of inspections can be varied as well. The invention is not limited to only these two types of inspections, and additional inspections can be added for various types of discs.

Since different kinds of scratches effect performance more than others, the inspection system 200 actually looks at the readability of the data on the disc to determine if it's a damage that really matters. Small defects are often concealed by error correction and concealment software in a particular player, so, for many types of media, only larger defects are important. The above-mentioned setting determines how often the inspector looks at the data as it scans across the entire disc. The amount of time it takes to inspect a disc depends on the kind of disc and this setting. For example, a DVD may take 1 or 2 minutes to inspect using the "Coarse" setting but almost 15 minutes to inspect at Super-fine. Usually a Fine or Medium works well.

Another optional operator-adjustable setting, called "Defect Setup" (not shown) determines how many damaged sections of the disc are counted before stopping the inspection process. Various criteria can be used in determining the damaged sections, but the preferred embodiment utilizes a criteria based in impairment in the performance or playback of the media. In some cases, if just one damaged section is found, the user may want the detection process to halt and the disc to be ejected. For other types of discs, a user may want to keep inspecting until 1, 2 or some other number of damages are found before ejecting the disc from the machine.

Figure 23:
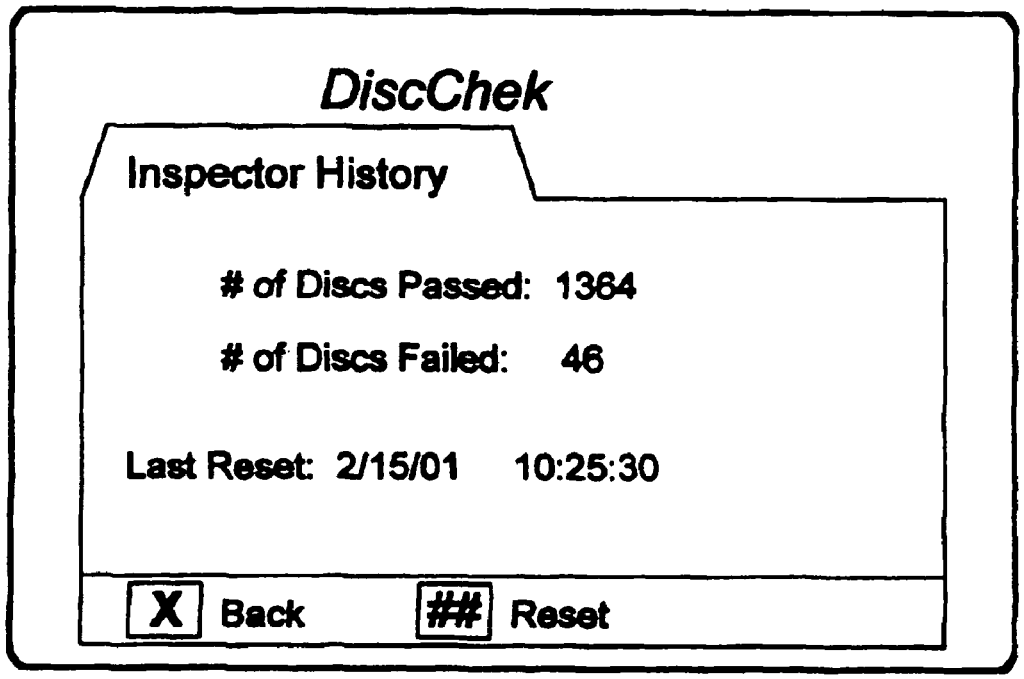

FIG. 23 illustrates access to a historical function where historical information stored in a memory (which is preferably non-volatile; non-volatile memory must be manually reset by the operator) of the main controller 95 is accumulated upon completion of an inspection operation. In an exemplary embodiment, this display mode may be entered by pressing the "*" key from either the Inspect 1 or Inspect 2 display. FIG. 23 shows a number of discs passed or failed, but the invention is understood to include any additional information associated with the inspection or repair operation, including the numbers of various types of discs, operation times (including, in the integrated configurations, any information associated with repair operations), material utilization, including roller/brush life, fluid quantities, etc. This function may also be used to alert users to implement maintenance or operational procedures such as changing rollers/brushes, replacing fluid, cleaning/repair modules, etc. FIG. 23 indicates the presence of a reset button in the display bottom region 224 by which accumulated data statistics can be reset. In an exemplary embodiment, the reset may be performed by pressing the "#" key—the inventive system may require this key to be depressed multiple times to prevent an accidental reset.

Once a configuration or setup is done via the entry of process parameters/criteria 510 (this does not need to be performed every time the inspection system is turned on), a disc may then be inspected. A disc is inserted 512 into an inspection disc drive 51, and the inspection system 200 reads information from the disc 514 (e.g., from a file allocation table or other media identification data) and stores it in a database of the main controller 95. This information can include, but is not limited to, the type of disc (e.g., CD-ROM, DVD-Movie, etc.), number of files, total amount of data, and/or other attributes of the disc.

A main loop is set up for the inspection that includes reading at least a disc cylinder (one complete revolution of the disc) according to a particular criteria 516. This criteria may be derived from the type of inspection setup selected as described above, i.e., the cylinder number is selected based on its position on the disc, such as 10 further from the last cylinder checked. A check is made to see if a fault is detected 518, based on criteria entered in the setup process 510. If so, another check is performed to see if the number of faults detected thus far have exceeded some criteria 528. For example, one may not wish to designate a disc is bad simply because one fault was found, as this may indicated a very minor problem with the disc. However if, for example, three faults were found, that may indicate that the disc is in need of repair. In an embodiment of the invention, a certain number of faults might suggest one type of treatment, e.g., a light polishing, and a higher number of faults may, but not necessarily, suggest a different type of treatment, e.g., a heavier buffing.

A differing type of inspection may proceed based on the type of disc being inspected and the respective constraints. For example, DVDs use data that has been encoded/encrypted—thus, the actual result of an inspection on a given cylinder may be provided by the drive itself (even though the control of movement to a particular cylinder may still be controlled by the inventive control mechanism). Whereas, the actual result of an inspection on a regular CD can be determined by the controllers of the invention. In other words, the invention may rely on a certain level of analysis from the hardware being used when necessary, but may make a lower level analysis when the hardware, technology, etc. permits.

If a critical number of faults is exceeded, the disc is ejected and removed from the inspection station 530. A repair may then be performed on the disc 532 if some overall disc failure count has not exceeded some criteria 524 (where the tracking is maintained in the historical database of the main controller), and, optionally, an additional inspection process invoked. If the overall disc failure count has exceeded some criteria 524, then the disc is designated a "bad" disc and removed from the system 526. Optionally, the historical database may be updated with this information.

If no fault was detected on a cylinder read 518, then a check is done to see if the inspection process for the disc is complete 520. If not, another cylinder is read according to the predefined criteria 516. Otherwise, the disc is designated a "good" disc and removed from the system 522. Optionally, the historical database may be updated with this information.

Figure 24:
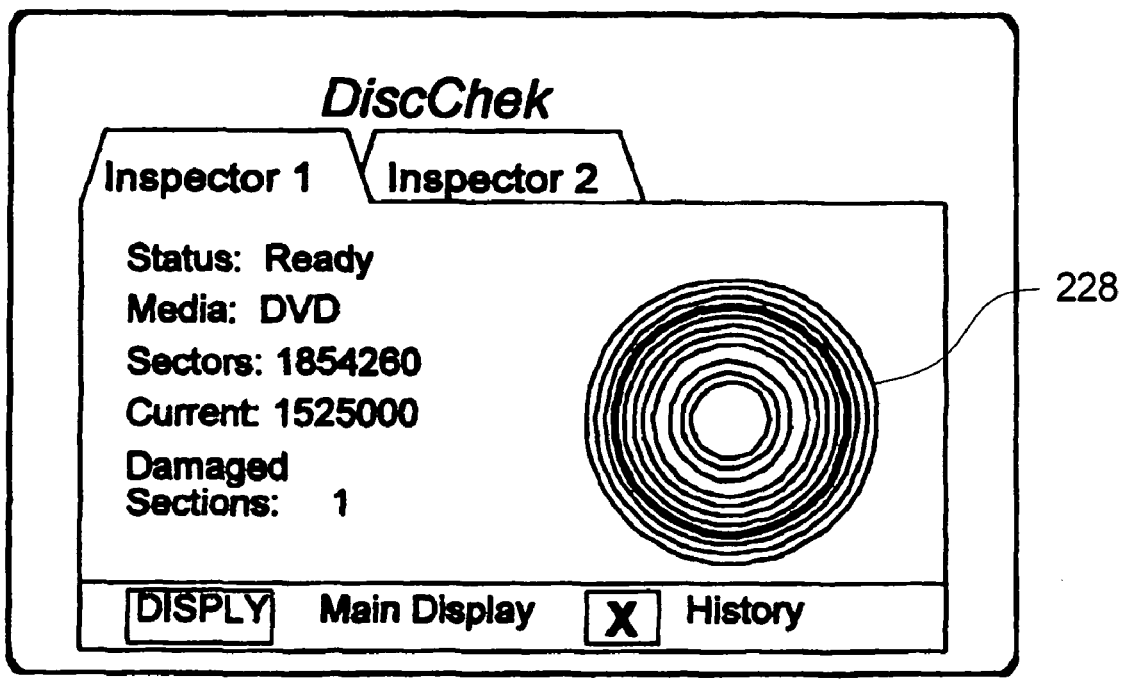
Figure 25:
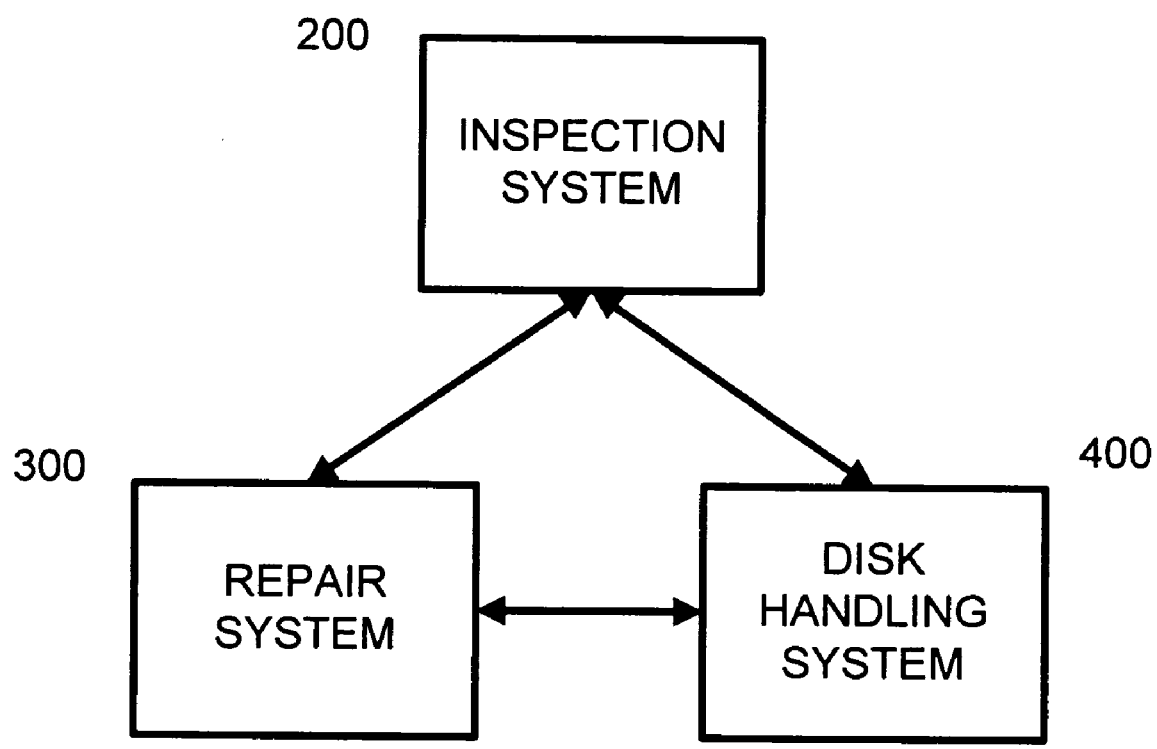
FIG. 25 is a high level block diagram showing the components of an inventive integrated system.

During the inspection process, a display as indicated in FIG. 24 may be provided. In the example illustrated, the two displays show exactly what each inspection drive is doing along with the results of the inspection as it proceeds. In the preferred embodiment illustrated, if a defect is found, a bright ring is shown on a pictorial disc representation on the display to represent approximately how far out from the middle the damage occurred. Sometimes, if two defects are found close together, it will count both but only one ring may be visible. This gives the user a "picture" (or an approximate graphic location of the damage) of the condition of the disc in addition to a count of damaged areas.

The display of FIG. 24 also indicates the "Damaged Sections." Extensive research has indicated that normally a physical scratch will disrupt many sectors of data on the disc, and thus, in order to give the operator a better idea of the actual disc condition, inventively, the display indicates the number of sections of the disc that contain one or more defects, as opposed to the individual errors determined.

Repair System

Figure 10:
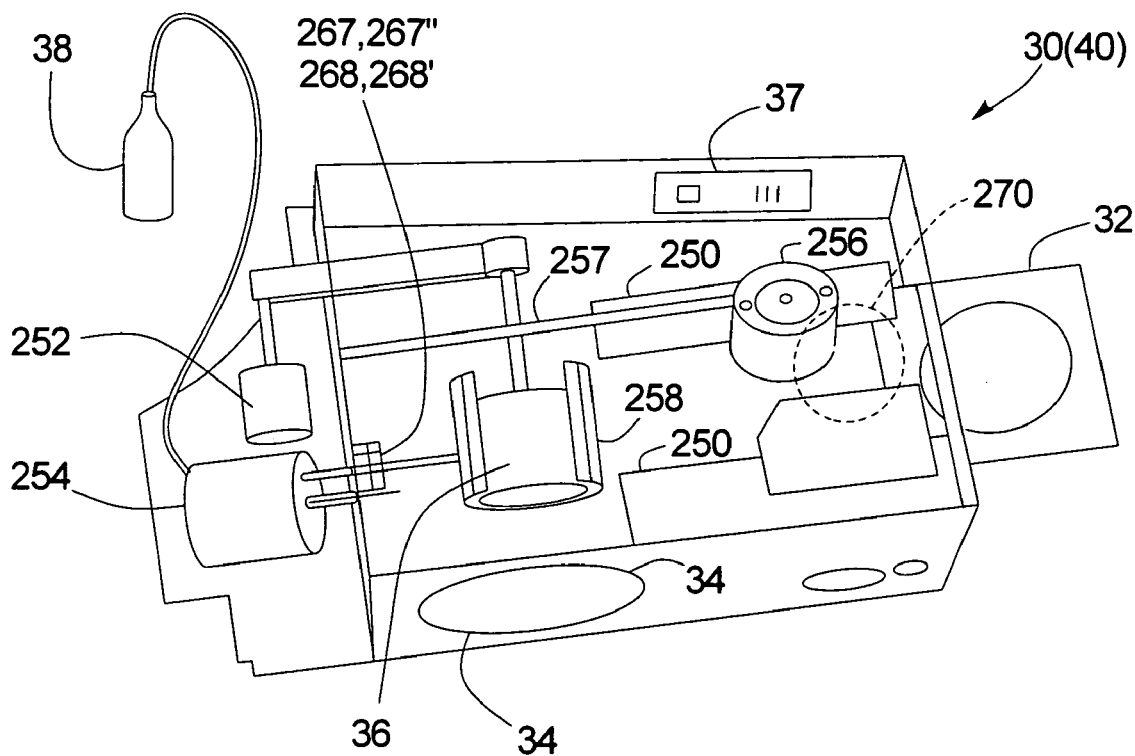
FIG. 10 is an isometric view of an inventive repair module (polish station, rejuvenation station) showing the basic components.

An inventive disc repair system is provided in the invention. FIG. 10 illustrates a basic component of the disc repair system. This disc repair system 300 comprises at least one station/module. In a preferred embodiment, the disc repair system 300 comprises two stations: a polish station 30 which is used to provide a polish to a disc and optionally provide an antistatic coating to prevent the disc from attracting dust, and a rejuvenation station 40, which provides a deeper level of buffing to effect the removal of scratches and other blemishes. The inventive concept can extend to systems with only one repair module, and can encompass systems having multiple modules.

The discussion below focuses on an exemplary rejuvenation station 40, but this discussion is applicable for the polish station 30, or any other like-constructed module as well. According to FIG. 10, which provides an isometric view of the polish station with the cover removed, a disc that needs to be repaired (rejuvenated, polished, etc.) is loaded into the station input tray 32 after the tray has been extended. The tray 32 is then closed and secured to a disc holding platter 278 of a disc holding assembly 270 (FIGS. 12, 13) in the following manner. The holding assembly 270 is lowered onto the disc until a holding hub 282 protrudes through the disc hole. In an alternate embodiment, the holding assembly 270 remains stationary while a raising mechanism 302 raises the disc onto the holding assembly 270. The disc is then in contact with the disc holding platter 278, which is constructed of a material and structure rigid enough to permit contact with a brush/roller 36 without causing severe deformation of the disc. In a preferred embodiment, there is a rubber platter 280 which prevents scratching of the disc and provides friction so that there is little or no slippage between the disc and the holding platter 278. In another preferred variant, there is a disc ejector mechanism 284 which provides a downward force on the disc so that it may be released easier. Ideally this disc ejector mechanism 284 comprises a thin (e.g., approximately 1" O.D.) spring (or other suitable material) ring that compresses when the disc is mounted. Other suitable variations, however, are within the scope of the invention.

Once the holding assembly 270 is lowered onto the disc, or the disc is pushed up onto the holding assembly 270, the holding hub firmly holds the disc against the holding platter 278. In a preferred embodiment of the invention, the holding hub 282 comprises a narrow portion 295 at its bottom which has a diameter slightly smaller than the hole in the center of the disc such that the disc can be centered fairly accurately. The holding hub 282 also comprises a wide portion 297 at its top which has a diameter significantly greater than the hole in the center of the disc such that the disc cannot be positioned within the wide portion 297, but rather rests against a bottom surface 298 of the wide portion.

Figure 14:
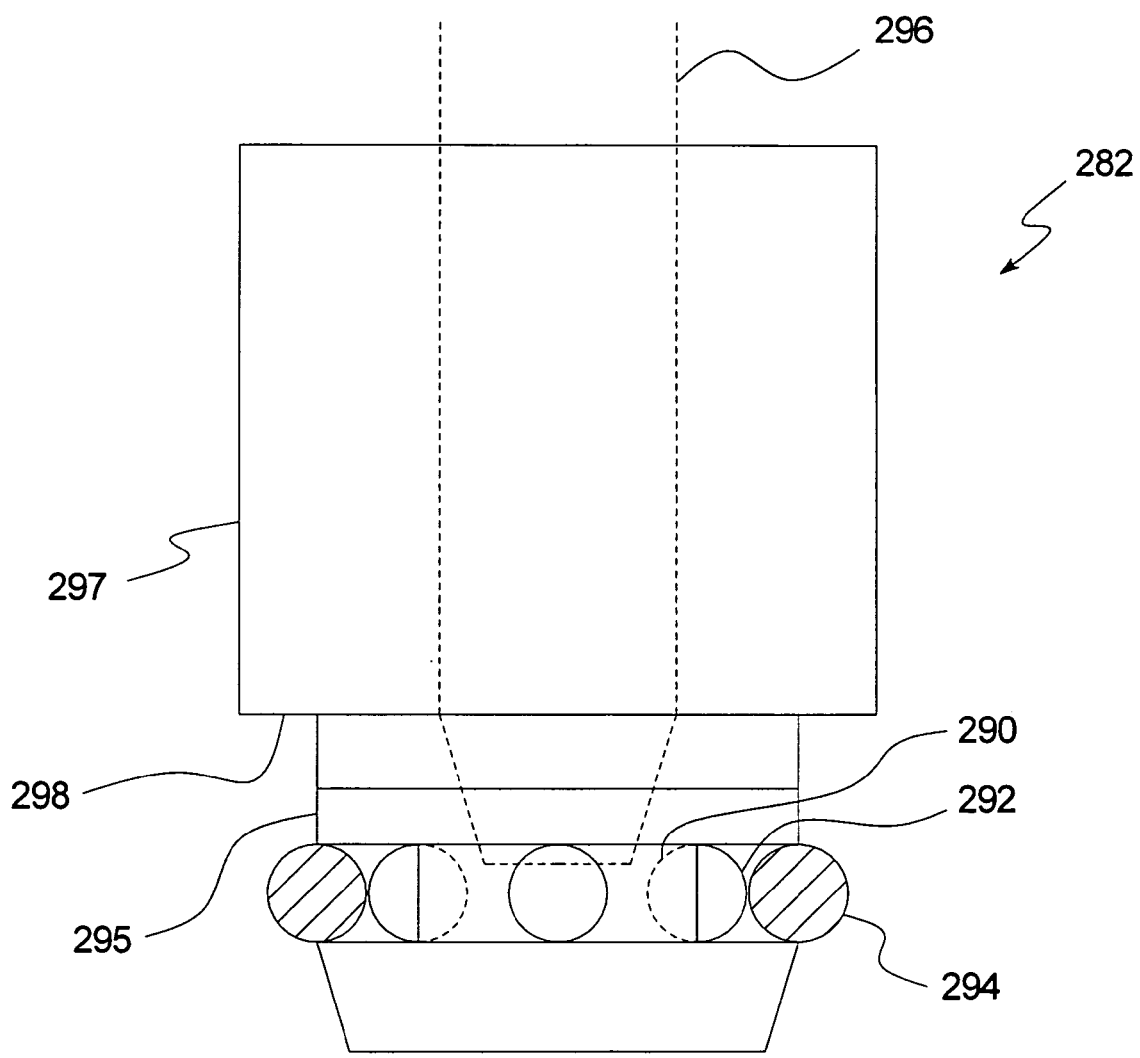
FIG. 14 is a side view of the inventive disc holding hub.

The narrow portion 295 has a circumferential groove that contains holes 290 that hold ball bearings 292 in place. An o-ring 294 is provided in the groove surrounding the ball bearings, shown in cross section in FIG. 14. The part of the narrow portion 295 above the o-ring 294 is roughly the same magnitude of size as the thickness of a disc, for example, in a preferred embodiment, this part above the o-ring is 0.093 inches compared to the disc which is approximately 0.050 inches thick. Once the holding assembly 270 is lowered onto the disc so that the narrow portion 295 is through the disc hole and the top surface of the disc is resting against the wide portion bottom surface, a pin 296 having a tapered bottom end is lowered where the tapered end of the pin 296 pushes against the ball bearings 292 which causes the o-ring 294 to expand so that its outer edge is a greater diameter than the diameter of the disc hole. Thus, the disc is securely held against between the o-ring 294 and the bottom surface of the wide portion 298. Other embodiments could be realized in which the plunger could move upward to push the balls outward.

Figure 11:
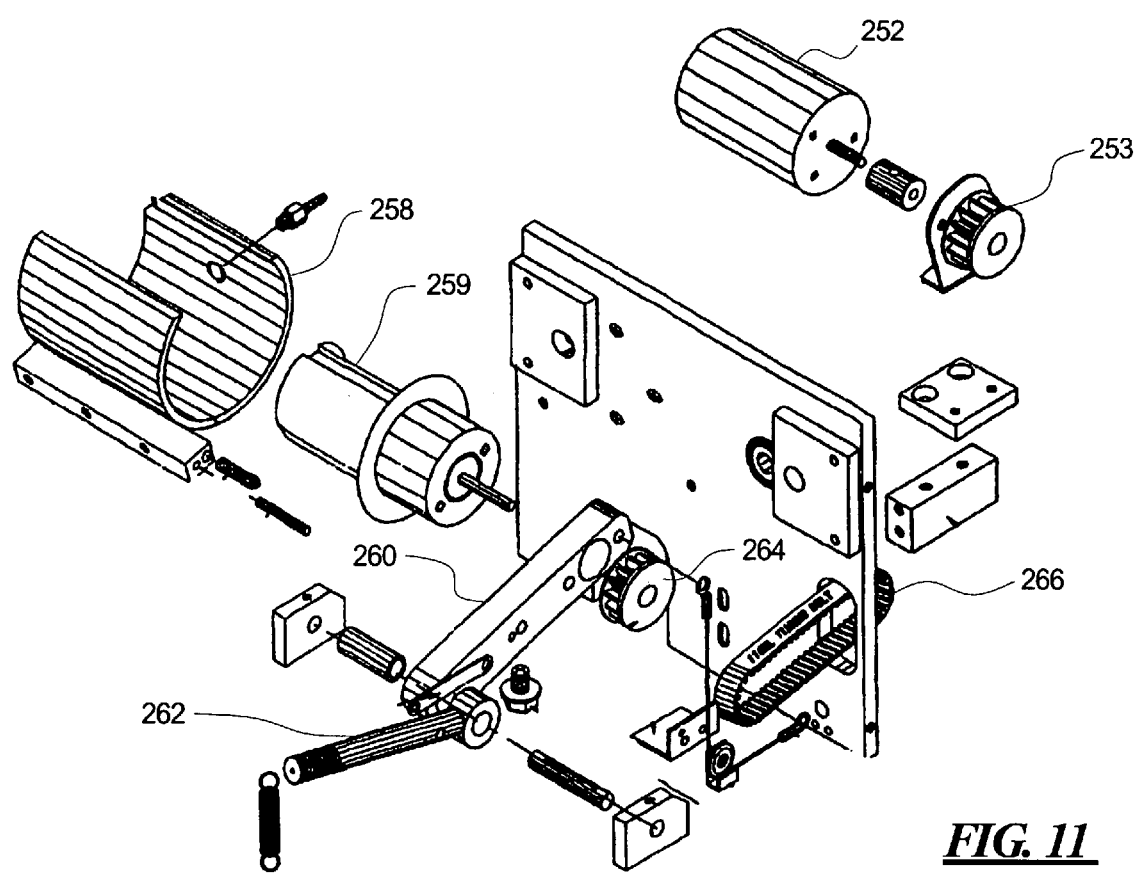
FIG. 11 is an exploded view of the components in an exemplary repair module.

The holding hub 282 with the disc is then withdrawn to draw the top surface of the disc against the holding platter 278 or any combination of the holding platter 278, rubber platter 280 and disc ejector mechanism 284. The disc holding assembly 270 holding the disc is then positioned to a disc cleaning position near the roller or brush 36, such that the disc can be moved back and forth in a radial direction of the disc. The disc can be moved into the correct position using, for example, a disc movement motor 256 connected to a lead screw 257 with movement along support rails 250. This gantry system that has the disc holding platter on it, moves the disc to the rear of the apparatus and it also causes the disc to oscillate back and forth over the roller(polishing or buffing brush). The oscillation over the repair roller could be a separate motorized mechanism. Sensors detect the position of the gantry and tell the control electronics, which controls the speed and direction of the gantry (disc holding assembly). After the disc repair process, the gantry moves the disc forward to a position over the tray. The disc is then dropped off the holding assembly down onto the tray. To make sure the disc drops onto the tray, the pusher assembly pushes the disc up and then down again. If sticking had occurred, the disc would now be released from the holding platter Once the disc is in the disc cleaning position, the platter 278 and disc begin spinning, and the brush (or roller) 36 also begins to spin, after being driven by a brush motor 252 (FIG. 11), which may be connected to the brush core 259 that holds the brush 36. This can be a direct connection, or, in a preferred embodiment that protects the motor, a belt 266 and wheels 253, 264), where the motor 252 may reside behind shielding. In a preferred embodiment, the brush 36 is a cylindrical brush similar to a common paint roller (e.g., 2" in diameter and 2" long), having a nap that contacts the disc surface. In a preferred embodiment, this brush is moved back and forth in a radial direction of the disc, and a distance that encompasses the data bearing portion of the radius of the disc. In another preferred embodiment, the brush 36 maintains only intermittent contact with the disc. This prevents frictional heat from building up on the disc that could damage it. This brush 36 can be easily changed when the module is installed via an access hole 34.

Fluid held in a station fluid container 38 (such as the water-based plastic polish Novus 1™—the fluid for the buffer may be different, largely water based, but may have some rouge or other polishing particulate matter in it) may be delivered to the brush 36 via a fluid pump 254. In the case of the polish station 30, the fluid is a polishing fluid that may contain an antistatic formula. In the case of the rejuvenation station 40, the fluid, in the preferred embodiment, serves to keep the brush 36 that may be impregnated with an abrasive moist, although the fluid itself may contain an abrasive as well. One advantageous aspect of the present invention is that the abrasive and brushing technique used by the rejuvenation station 40 permits the disc to be rejuvenated many more times that other disc rejuvenation systems that grind down the disc thickness significantly with a sandpaper-like material—the inventive system is designed to permit rejuvenation of a disc over 100 times without reducing the playability of the medium. A brush cover 258 is provided to shield the interior of the unit from being contaminated with fluid or abrasive material. A tube connecting the pump may be provided at an opening in the brush cover 258 to deliver fluid to the brush.

The low level movement and control of the brush, disc tray 32, disc holding assembly 270, and pump 254 may be performed by a station controller 37 which may be a separate unit from the main controller 95, but may be connected to the main controller 95 to communicate various system level commands, parameters, etc. where appropriate. For example, the brush 36 may only be required to receive fluid at startup (when the disc is loaded) and/or at periodic intervals thereafter; ideally, providing has been found to work advantageously. The station controller 37 can implement such functions either in a standalone manner, or after receiving information from the main controller. Other possible parameter variations include how long the disc is keep in the brushing cycle, the speed of rotation of the disc or brush 36, the pressure of the brush applied to the disc (if a pressure sensor is included), the speed of moving the brush 36 back and forth with respect to the disc, and other system parameters.

The primary difference between the rejuvenation station 40 and the polish station 30 is that the rejuvenation station brush 46 may use an abrasive compound that removes part of the polysilicon disc when the depth of the defect warrants its use. This abrasive compound may be any standard compound that has an extremely fine grit, such as rouge. In a preferred embodiment, the rejuvenation station brush 46 may have an abrasive material impregnated by the brush manufacturer so that the fluid serves to keep the brush moist in order to effectuate this impregnated abrasive material. However, such an impregnation could be done by the user as well.

The polish station brush 36, on the other hand, uses a polishing compound. The polishing compound may include an antistatic compound that prevents static electricity from building up on the disc thereby causing it to attract dust.

An additional inventive feature of the station modules 30, 40 is that they may be designed to be slideably mounted in a rack (190, FIG. 5) or other station holder. This mounting capability may include mated fluid hose connector pairs 267, 267' (FIGS. 15A, B) and mated electrical connector pairs 268, 268' so that both the electrical and fluid systems are connected intact when the module is slid into the rack 190 without requiring any additional connections to be performed. This helps speed the insertion and removal of a module for maintenance, repair, etc.

Manual Integrated System

Figure 5:
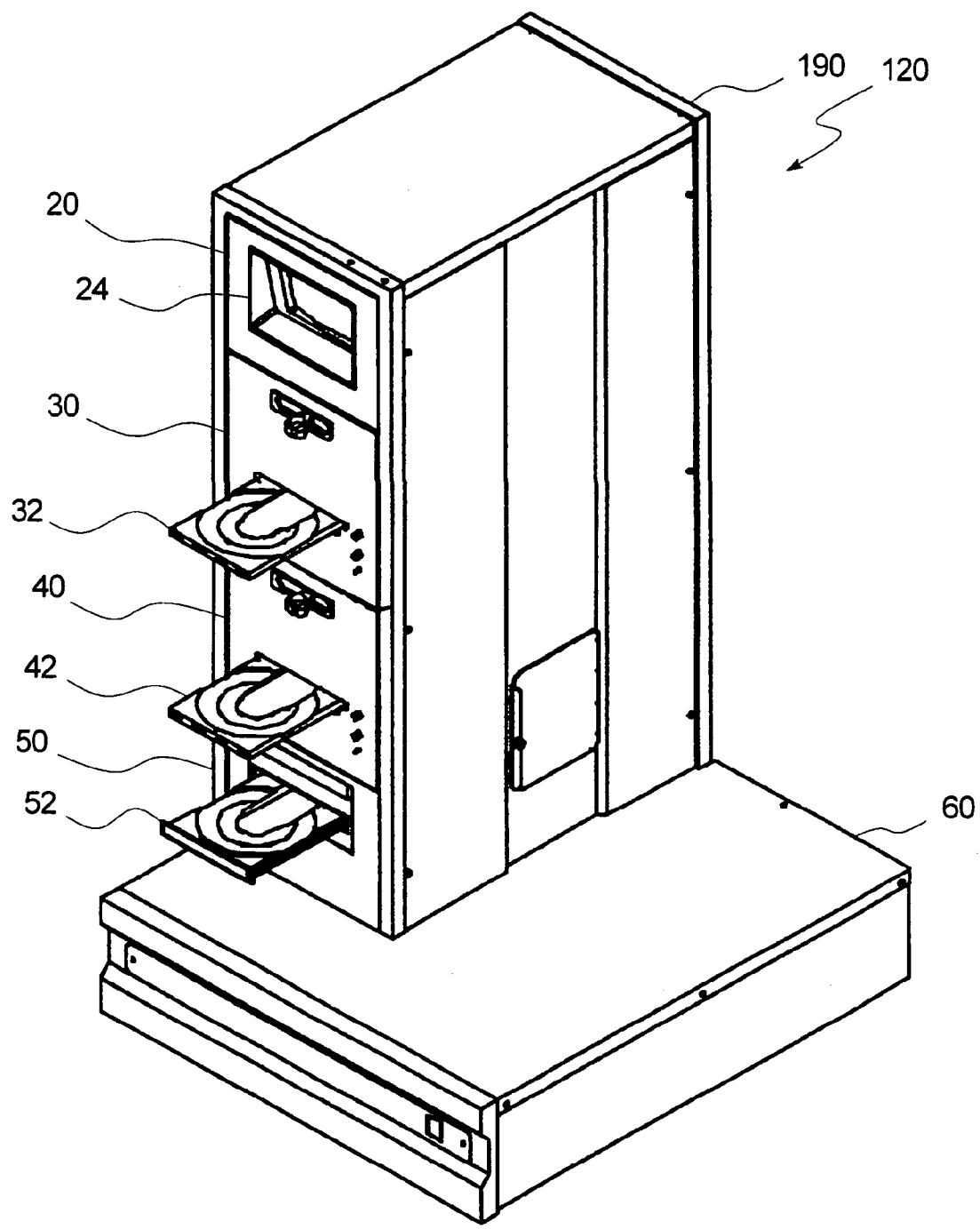
FIG. 5 is an isometric pictorial view of the inventive integrated manual disc inspection and repair system without the automation features.

According to an embodiment of the invention, the inspection system 200 and the repair system 300 may be integrated into a single unit as an integrated manual inspection and repair system 120 (FIG. 5). In an exemplary integrated manual inspection and repair system 120, a base 60 is provided that may be used to house common system components, such as the main controller 95, etc. FIG. 5 illustrates the integrated system 120 having a polish station 30 with its input tray 32 extended, a rejuvenation station 40 with its input tray extended 42, an inspection station 50 with its input tray 52 extended, and a user display 20 with its display screen 24. These components are all mounted on an assembly rack 190. Any number of components can be utilized in the manual inspection and repair system 120. The advantage to the integrated manual inspection station 120 is that the unit is relatively self contained, and may share common system components, such as power busses, the main controller 95, and other common elements. Whereas conventional disc repair systems tend to be messy and are located away from areas such as offices spaces, this self-contained unit can be used anywhere, since the covering shields the exterior of the unit from spray, abrasives, and other potential contaminants. Thus, the inventive solution can be used in an area where cleanliness is important.

Figure 6:
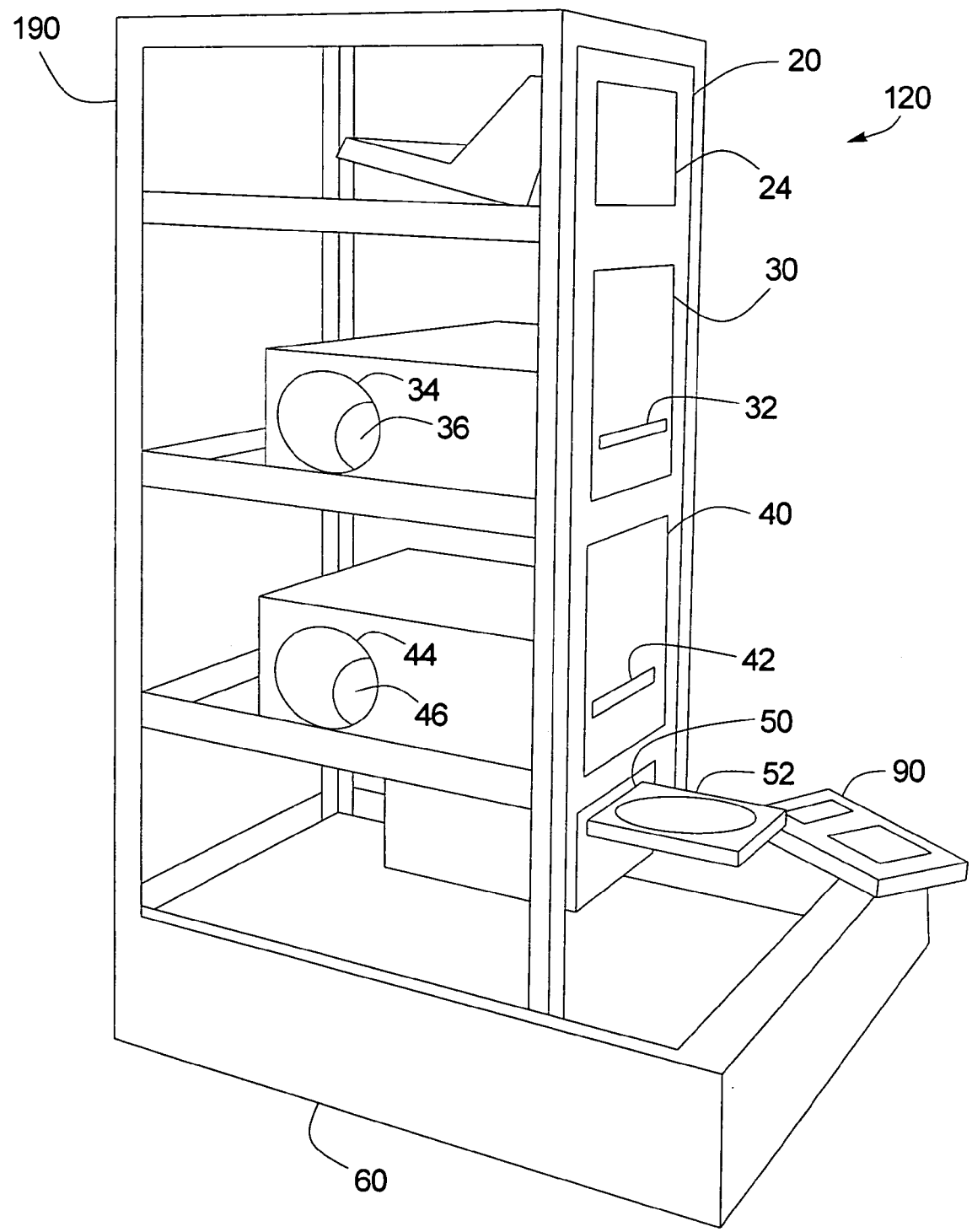
FIG. 6 is an isometric pictorial view of the inventive integrated manual disc inspection and repair system with the covers removed to show the station components.
Figure 7:
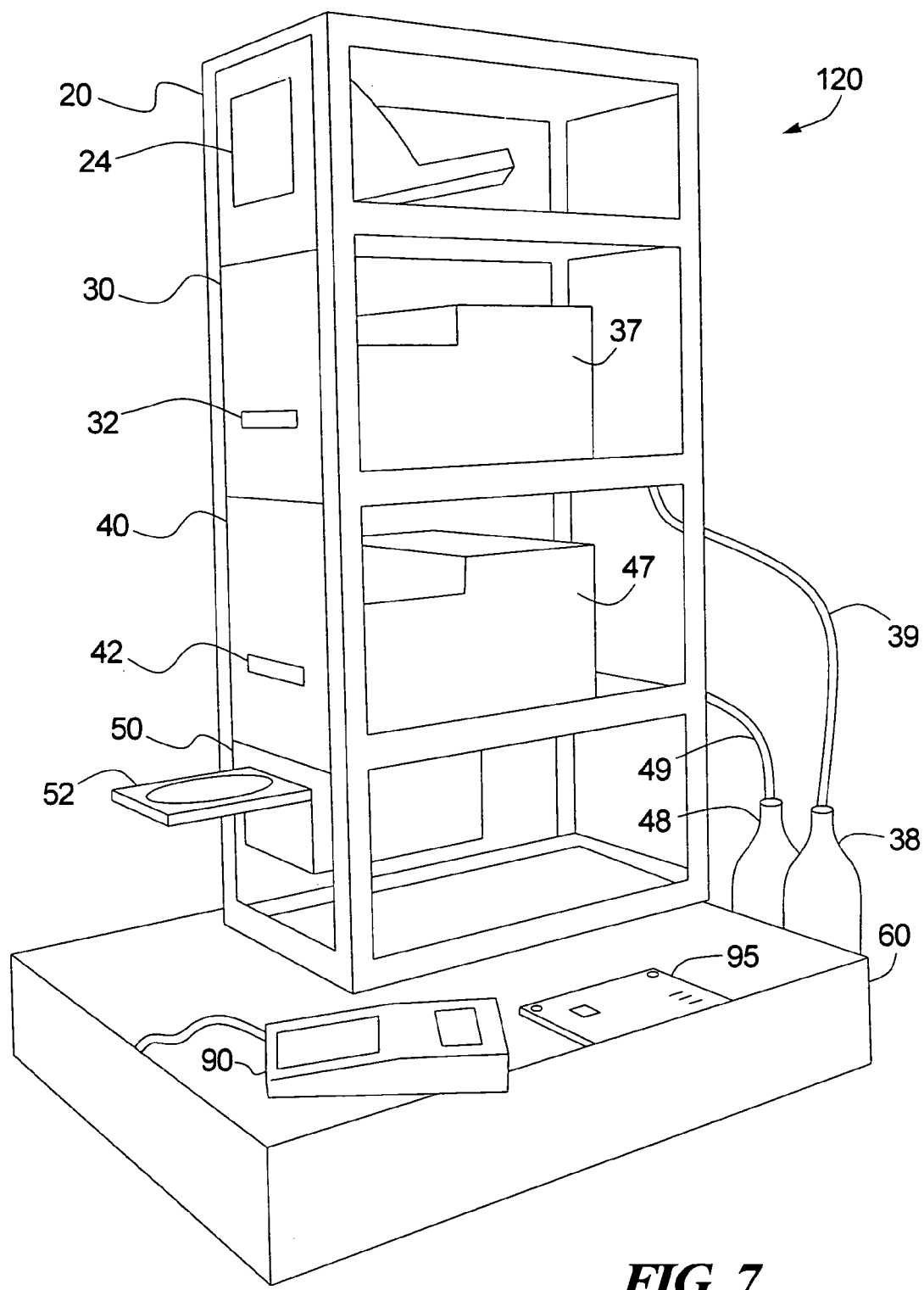
FIG. 7 is a further isometric pictorial view of the inventive integrated manual disc inspection and repair system with the covers removed to show the station components.

FIGS. 6 and 7 show the integrated manual inspection and repair system 120 with the covers removed to show limited detail of the components in the preferred embodiment. Partial detail of the repair stations 30, 40 can be seen, including the brushes 36, 46, the access holes 34, 44, and the station controllers 37, 47, along with the fluid containers 38, 48. These Figs. also show an exemplary placement of the main controller 95 and the keyboard 90. The station controllers 37, 47, user display 20, inspection station 50, and keyboard 90 may all be connected to the main controller 95 to provide status information to the user and to allow the input of various parameters and control by the user.

When a user operates the integrated manual inspection and repair system 120, the user first ensures that there is adequate fluid in the fluid containers 38, 48, and performs any preliminary configuration, such as setting parameters, etc. using the user input device 90 and user display 20. A disc is then inserted into the inspection station 50, where it is subjected to an inspection procedure described above. When the inspection is complete, the results are displayed to the user who then inserts the disc in an appropriate repair station. If the disc is only lightly damaged, the user may decide to place the disc in the polish station 30 only to execute a polish operation on the disc. Alternately, if the disc is indicated as moderately or significantly damaged, the user may decide to place the disc in the rejuvenation station 40 and execute the rejuvenation operation prior to placing the disc in the polish station 30. The user may then opt to inspect the disc again at the inspection station 50 and repeat the above process if the results indicate continued problems with the disc.

Automated Integrated System

Figure 2:
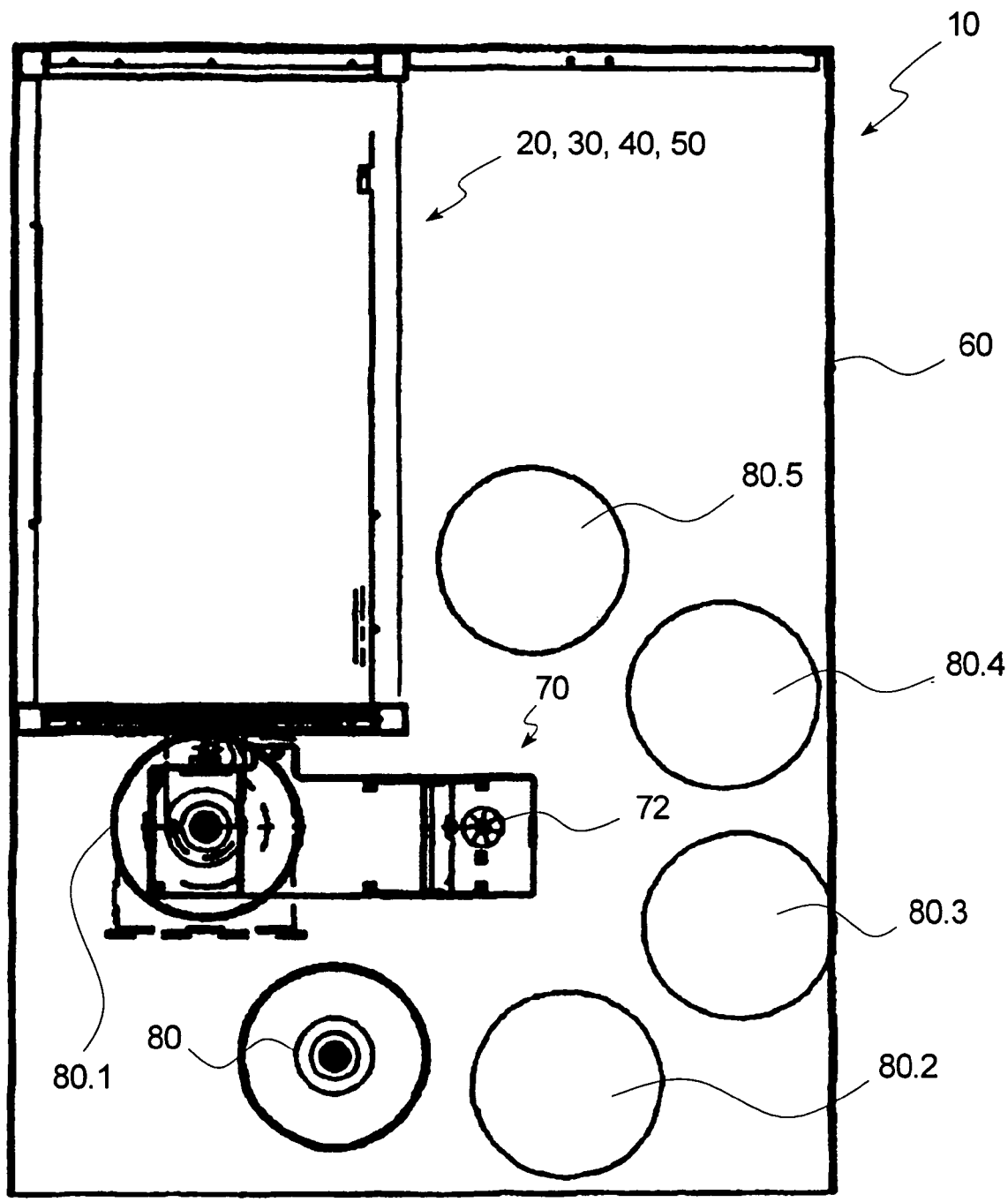
FIG. 2 is a top view of the inventive disc inspection and repair system.
Figure 3:
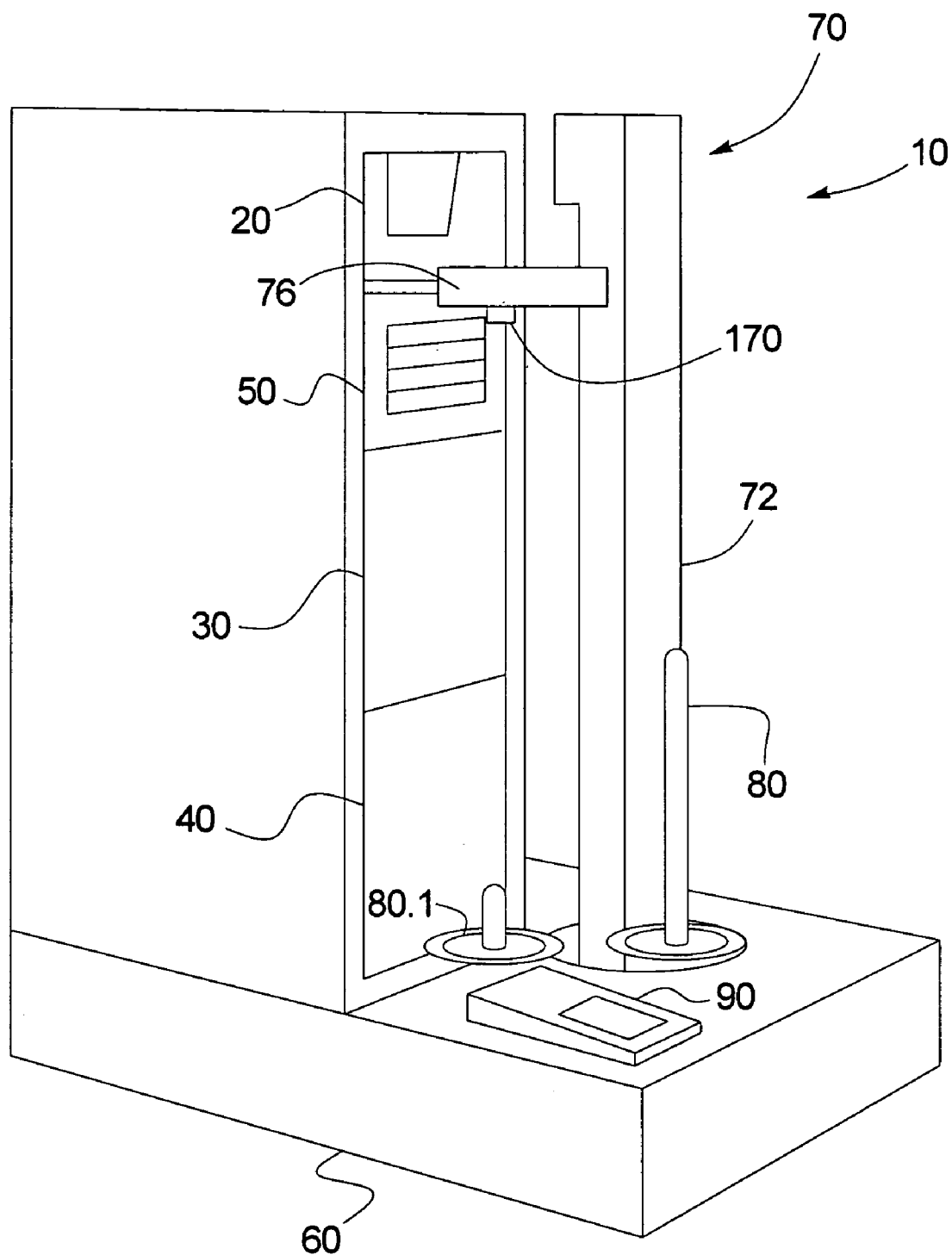
FIG. 3 is an isometric pictorial view of the inventive integrated disc inspection and repair system.
Figure 4:
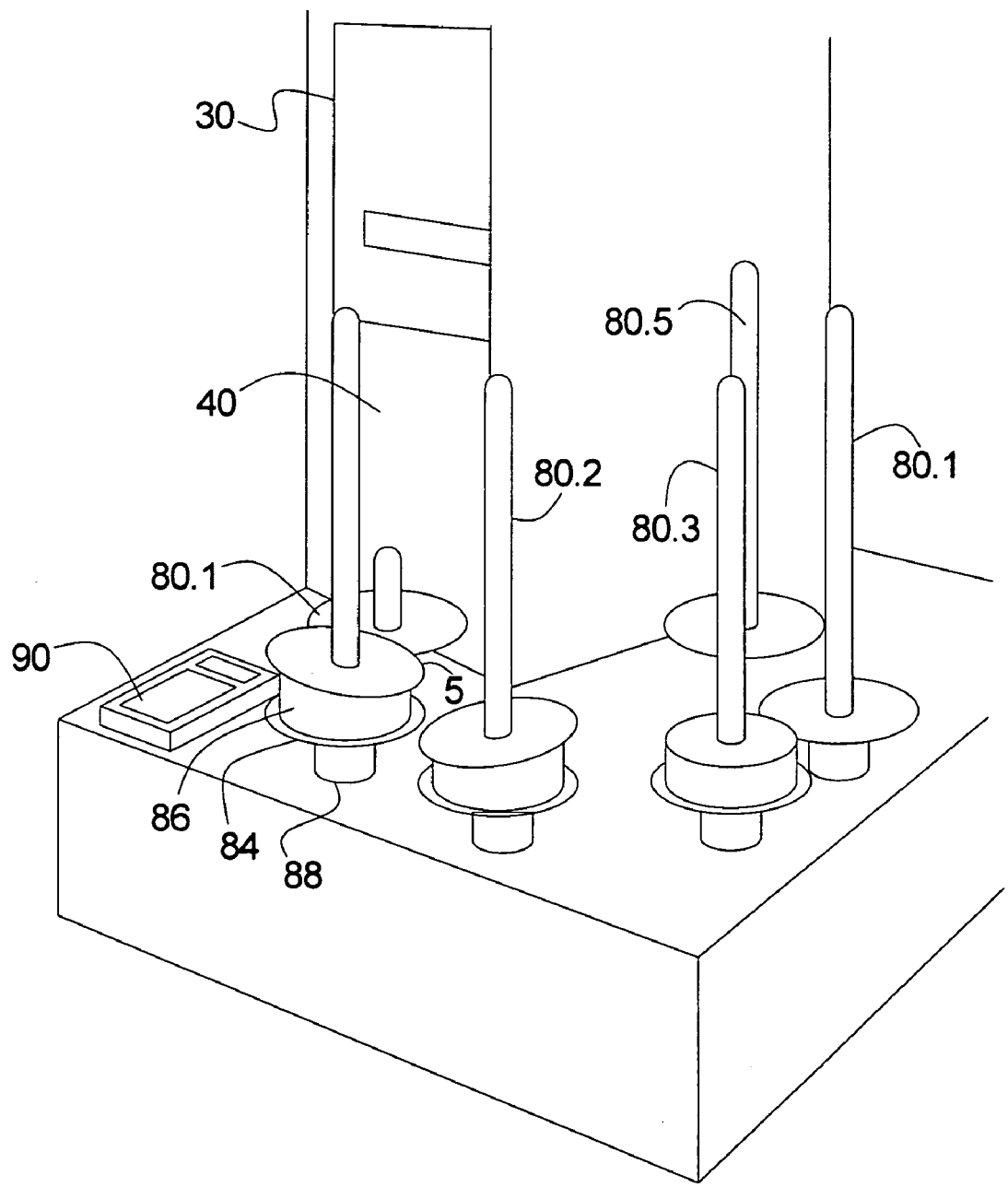
FIG. 4 is an isometric pictorial view of the inventive integrated disc inspection and repair system showing spindle assemblies.

FIGS. 3 and 4 are isometric views showing the integrated automated disc inspection and repair system 10, and FIGS. 1A and 2 respectively show a front and side view of the automated system 10. This unit is structurally similar to the integrated manual inspection and repair system 120, but includes a number of spindles 80–80.5, a robotic arm assembly 70, and appertaining drives and support hardware and software. This automated system 10 permits a user to load a large number of discs onto an input spindle 80 and return only after an inspection, repair, and sorting of all discs has been completed. The elements of the automated system 10 are described in more detail below. The use of spindles 80–80.5 is used in the preferred embodiment, but holding, sorting or storage mechanisms of other types that are used as disc holding devices, such as bins, shelves, slots, etc., are not outside of the scope of the invention.

Robotic Arm Assembly

The robotic arm assembly 70 is affixed to the base 60 and comprises a robotic arm vertical portion 72 configured to rotate about an axis. This rotation is controlled by a robotic arm rotational drive 71, which may be a stepper motor or any other suitable device for rotation that can be accurately controlled. The vertical portion 72 contains a mechanism to permit movement of a robotic arm disc carrying assembly 76 in a direction parallel to the axis of rotation. The vertical portion 72 also contains a pneumatic line for delivering a vacuum to the disc-carrying assembly 76. The vertical motion of the disc carrying assembly 76 is controlled by a robotic arm vertical drive 73, which may be a stepper motor and connecting mechanism or any other suitable device for-linear positioning that can be accurately controlled. The disc carrying assembly 76 is connected to the robotic arm vertical portion by a robotic arm fastening bracket.

The robotic arm assembly 70 works as follows. A disc is placed on the input spindle assembly 80. A command is issued by the control 95 to the vertical drive 73 and rotational drive 71, which are all preferably located in the base 60, to move the disc from the input spindle assembly 80 the inspection station 50 or a repair station 30, 40. The disc carrying assembly 76 is moved higher than the spindle disc loading portion 82, and is rotated so that the center of a disc centering mechanism 170 is positioned directly over the center of the spindle assembly 80. The disc carrying assembly is lowered over the spindle until the disc carrying assembly 76 is close enough to the disc so that it can be picked up with a vacuum that is supplied to the disc carrying assembly. The disc is then positioned above an input tray of one of the stations 32, 42, 52 which has been opened, and then placed in one of these input trays 32, 42, 52. The vacuum is then released from the disc carrying assembly 76, and the disc carrying assembly is moved to another position. The input tray drawer 32, 42, 52 is then closed, and an appropriate operation is performed on the disc.

Disc Carrying Assembly, Including Centering Mechanism

The disc carrying assembly 76 may comprise a disc centering mechanism 170 that is configured as follows in a preferred embodiment. According to FIG. A1A, the centering mechanism 170 comprises a rotatable arm 172 that pivots about an arm pivot 174. Arm 172 is held in its horizontal position by weight and a magnetic force. Therefore, the arm doesn't rotate until the centering plunger has moved vertically first. See the magnet in FIG. 1B. The pivot may simply be a pin that extends through holes in the rotatable arm 172 and is fastened to the disc carrying assembly 76. The centering mechanism 170 also comprises a centering pin 175 having a tapered head 176 having a frustoconical shape, a shaft 178, and a back stop 177. The centering mechanism 170 works as follows.

Prior to moving the disc carrying assembly 76 over a spindle 80, the centering pin 175 is in a lowered position due to the fact that the centering pin 175 is made of brass or some other suitably heavy material such that gravity pulls the centering pin into its lowest position. The centering pin 175 is held in its lowest position by a centering pin back stop 177 whose lower surface contacts a top surface of the rotatable arm 172 and is too large to go through a shaft hole in the rotatable arm 172.

As the carrying assembly 76 is lowered over the spindle 80, the bottom surface of the centering pin tapered head 176 contacts the top of the spindle disc loading portion 82 and is pushed vertically upwards as the carrying assembly 76 is lowered. The vertical motion of the centering pin 175 continues as the centering pin shaft 178 moves through the shaft hole of the rotatable arm 172 until the top surface of the centering pin tapered head 176, which is larger than the shaft hole, contacts the lower surface of the rotatable arm 172. This causes the upward force from the spindle disc loading portion 82 to rotate about the rotatable arm pivot so that the entire disc centering mechanism is out of the way as the carrying assembly 76 moves down the spindle assembly 80.

The disc 5 is picked up by the carrying assembly 76 and lifted over the top of the spindle assembly 80. As the carrying assembly 76 with the disc 5 begins to move over the top of the disc loading portion 82, the rotatable arm 172 lowers to its horizontal position thereby causing the disc centering pin 175 to slide linearly in a downward direction by its weight. The bottom side of the tapered head 176 has a diameter that is less that the diameter of the disc hole 6, and the top part of the tapered head 176 has a diameter that is more than the diameter of the disc hole 6, such that the disc partially slides onto the tapered head. The weight force of the centering pin 175 is sufficient to induce a horizontal movement in the disc 5 by applying pressure against the disc hole 6 side until the disc 5 is centered with respect to the centering pin 175. This ensures a precise vertical and horizontal position of the disc 5 with respect to the disc carrying assembly 76.

Spindle Assembly

In a preferred embodiment, the spindle assembly 80 is configured to help prevent discs 5 from sticking together as they are removed from the spindle assembly 80. This may be done by providing an offset in the input spindle 181 (FIG. 1D) at the spindle disc loading portion 82. Additionally, the robot arm may wiggle back and forth to separate the discs. At the offset, a groove just larger than the disc thickness forces the bottom, unwanted disc to slide sideways and become un-stuck to the top, desired disc. The bottom disc or discs fall down onto the disc stack at the bottom of the input spindle.

In another embodiment, the spindle assembly 80 is configured to help prevent discs 5 from sticking together as they are removed from the spindle assembly 80. This may be done by providing pressurized air exit holes 182 (FIG. 1C) at the spindle disc loading portion 82, and providing air pressure to the exit holes 182 through a pressurized air channel 180. In another embodiment, the air pressure is rapidly pulsed, but this is not essential. If two or more discs are stuck together, the pressurized air blowing from the air exit holes 182 serves to force air between the discs, forcing the bottom disc(s) to separate and fall back down the spindle 80. As the disc carrying assembly 76 is raising one or more discs past the air exit holes 182, its vertical motion may be slowed to increase the amount of time that the discs experience the pressurized air.

Although not essential to the invention, in a preferred embodiment, a further mechanism for preventing multiple discs from sticking together is provided. According to FIG. A4, the input spindle assembly comprises a spindle disc base mount 88 that affixes the spindle assembly 80 to the base 60. A spindle base 84 rests on top of the base mount 88. A disc support 86 rests on top of the spindle base 84 upon which a lowest disc in a stack rests. This disc support 86 is preferably made from a soft material to avoid further damaging the discs, and may possess antistatic properties. Inventively, the top surface of the disc support 86 sits at an angle from the horizontal, which thus makes any discs stacked on the spindle lie in a plane that differs from a horizontal plane (with respect to the direction of gravity). Since the disc carrying assembly 76 has a bottom surface that is essentially horizontal, when it approaches the top disc, one of the assembly's 76 edges is closer to one side of the disc 5 than the other. The result is that the top disc, which may be stuck to a lower disc by a vacuum between the discs, static electricity, and/or a foreign substance, is "peeled" from the disc below it. This peeling effect greatly reduces the likelihood that two or more discs will stick together.

In a preferred embodiment of the invention, multiple spindle assemblies 80-80.5 (FIG. 2). Although other configurations of spindles are possible, this preferred embodiment comprises an input spindle assembly 80 at which discs waiting to be inspected/repaired are queued up. This spindle assembly 80 can hold as many as 75 discs or even many more, depending on design and performance constraints. Also present are a holding spindle assembly 80.1, a good CD spindle assembly 80.2 which holds CDs that are inspected and ultimately prove to be "good" by some predefined criteria, a bad CD spindle assembly 80.3 which holds CDs that are inspected and ultimately prove to be "bad" by some predefined criteria, a good DVD spindle assembly 80.4, and a bad DVD spindle assembly 80.5. A preferred embodiment of the invention provides that these spindle assemblies 80–80.5 have their centers located in a circular arc about the robotic arm disc carrying assembly 76, however, a linear placement of the spindle assemblies or any other placement and respective robotic arm movement to accommodate such movement is considered to be within the scope of the invention. The delineation of discs between CDs/DVDs/other, and/or "good"/"bad"/other status, or any other criterion is made by the inspection station/process so that a disc 5 can be placed on the correct spindle assembly.

Automated System Control

Figure 26:
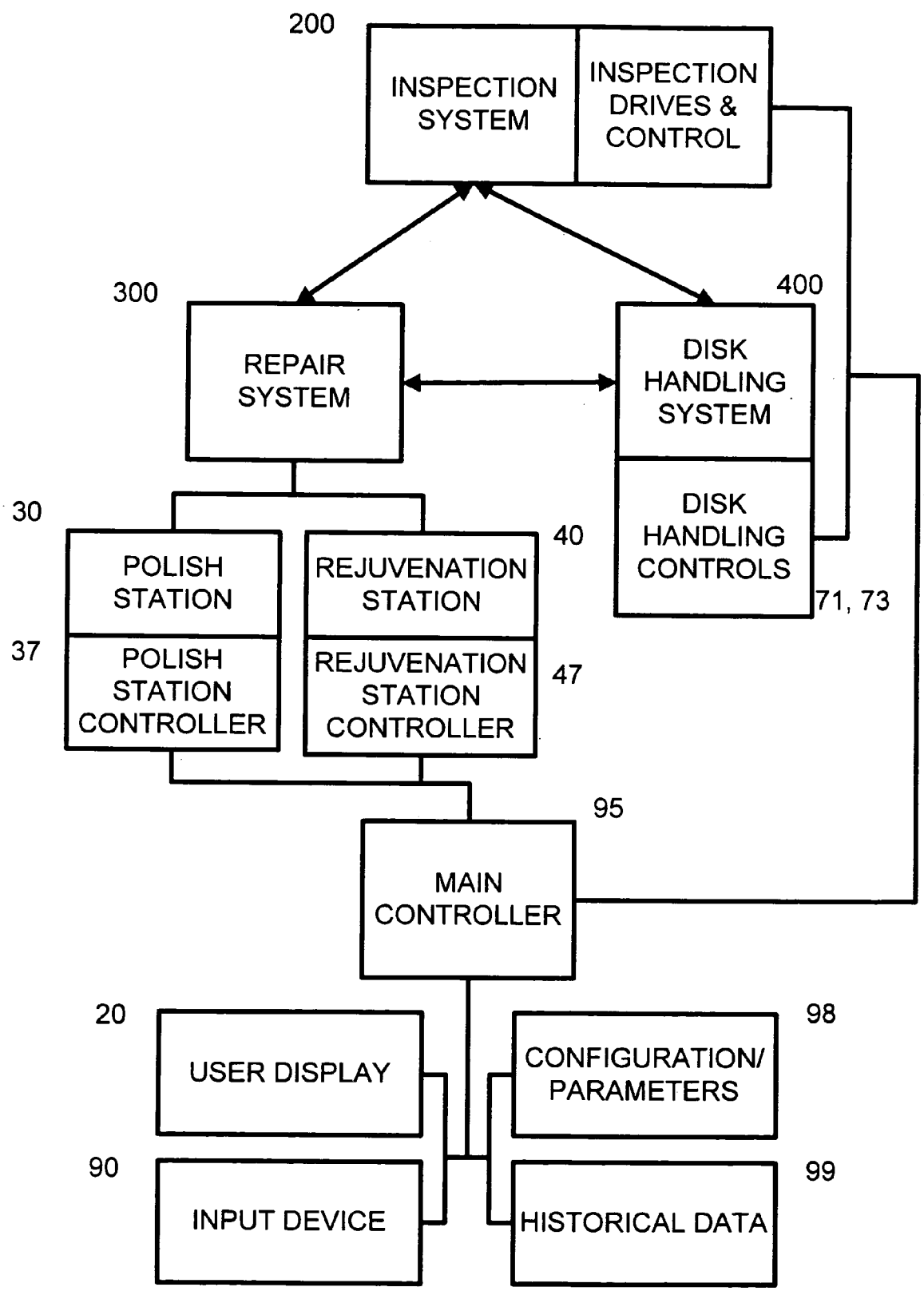
FIG. 26 is a block diagram illustrating the relationship between the various system components.

The automated system 10 includes control functions provided by the main controller 95 that serve to link together each of the individual systems and support the above-described functionality. According to FIG. 26, the main controller 95 is connected both to the user display 20 and the input device 90, serving, in the preferred embodiment, as the mechanism for dealing with user I/O. The main controller also stores the configuration data in a configuration/parameters database 98, which is preferably a non-volatile storage media (e.g., non-volatile RAM, disc drive, etc.) so that parameters do not have to be entered at each power up. These parameters can include, but are not limited to, parameters pertaining to the inspection process, such as how many types of searches are done, how many tracks are skipped for a given type of search, parameters associated with the repair system, such as the relationship between the errors detected during inspection and the type of repair required (e.g., polishing or rejuvenation and polishing), brush characteristics such as rotational speed, number of times moved back and forth across the disc or speed at which the brush is moved across the disc, total time that the disc spends in each station, etc.

The main controller also stores historical data 99 collected from the disc inspection and repair operations. This information can include, but is not limited to numbers and types of discs run through the system, they types and severity of errors encountered, historical records for each and every disc run through the system, the specific processes that a particular disc has gone through. The historical data 99 can also be utilized by the main controller 95 to provide statistical summaries of data. Furthermore, this historical data can be utilized for optimizing the processes for future handling of certain types of problems, which can include utilization of neural networks and fuzzy logic or any other suitable process optimization procedure.

The main controller 95 can also be used to communication with the controls of the respective stations and systems, i.e., the polish station controller 37, the rejuvenation station controller 47, the disc handling controls 71, 73, and the inspection drives and control 51, 53. The interfaces used to communication can pass along parameter and control information that permits the main controller 95 to perform any operations in the system in an automated manner. Since, in the preferred embodiment, the main controller 95 is based on a standard IBM PC-type motherboard, it can utilize a vast array of programming and design components that are standard in the industry. Finally, the system could utilize an uninterruptable power supply so that an orderly shutdown can occur in the event of a power failure.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

LIST OF REFERENCE CHARACTERS 5 disc
6 disc hole
10 integrated automated disc inspection and repair system
20 user display
22 user display frame
24 user display screen
30 polish station
32 polish station input tray
34 polish station brush access hole
36 polish station brush
37 polish station controller
38 polish station fluid container
39 polish station fluid delivery conduit
40 rejuvenation station
42 rejuvenation station input tray 44 rejuvenation station brush access hole
46 rejuvenation station brush
47 rejuvenation station controller
48 rejuvenation station fluid container
49 rejuvenation station fluid delivery conduit
50 inspection station
51 inspection disc drive
51' additional inspection disc drive
52 inspection drive input tray
53 inspection system control
60 base
70 robotic arm assembly
71 robotic arm rotational drive
72 robotic arm vertical portion
73 robotic arm vertical drive
74 robotic arm fastening bracket
76 robotic arm disc carrying assembly
80 input spindle assembly
80.1 holding spindle assembly
80.2 good CD spindle assembly
80.3 bad CD spindle assembly
80.4 good DVD spindle assembly
80.5 bad DVD spindle assembly
82 spindle input/disc loading portion
84 spindle base
86 spindle disc support
88 spindle disc base mount
90 user input device
92 main numeric keypad
94 function keypad
95 main controller
97 security board
98 configuration/parameter database
99 historical data database
110 standalone inspection system
120 integrated manual inspection and repair system
130 standalone repair system
170 disc centering mechanism
172 disc centering rotatable arm
174 disc centering rotatable arm pivot
175 disc centering pin
176 disc centering pin tapered head
177 disc centering pin back stop
178 disc centering pin shaft
180 Pressurized air channel
181 Spindle offset groove
182 Pressurized air exit holes
190 assembly rack
200 inspection system
220 display tabbed menu
222 display main region
224 display bottom region
226 password screen
228 pictorial disc representation
253 brush drive wheel
254 fluid pump
256 disc movement motor
257 lead screw
258 brush cover
259 brush core
264 brush drive wheel
266 belt
267 fluid hose connector
267' mating fluid hose connector
268 electrical connector
268' mating electrical connector
270 disc holding assembly
278 disc holding platter
280 rubber platter
282 holding hub
284 disc ejector mechanism
290 circumferential groove holes
292 circumferential groove ball bearings
294 circumferential groove o-ring
295 holding hub narrow portion
296 holding hub pin
297 holding hub wide portion
298 holding hub wide portion bottom surface
300 repair system
400 disc handling system
500 inspection process

What is claimed is:

1. An optical disc inspection system, comprising:
an inspection station having a drive input tray to receive a disc to be inspected, the inspection station being configured to check a track integrity and the track being chosen by a predetermined criterion, the inspection station being configured to determine a type of disc and make an appropriate inspection that is dependent on the type of disc;
a user display for displaying a status of an inspection operation on the disc performed by the inspection station;
a user input device for entering parameters for the inspection station and controlling the inspection station; and
a main controller that is connected to the inspection station, the user display, and the user input device that controls the inspection operation, the main controller being configured to provide some indication of results of an inspection.

2. The disc inspection system according to claim 1, wherein the disc inspection station contains more than one disc drive.

3. The disc inspection system according to claim 1, further comprising a security board that protects system software on the main controller so that the system software can only be run with proper authorization.

4. The disc inspection system according to claim 1, wherein the user input device is a keyboard.

5. The disc inspection system according to claim 4, wherein the keyboard is a 21-key keyboard comprising at least one of a start/stop key for starting and stopping an inspection operation, an open/close key for opening and closing an inspection drive input tray, a display key for displaying information about a selected drive's operation, and a key for selecting which inspection station to operate on.

6. The disc inspection system according to claim 1, wherein the display comprises:
a main display option for showing a status of the inspection drives; and
a setup display for configuring an inspector setup, defect setup, or password change for entering a setup mode.

7. The disc inspection system according to claim 6, wherein the inspector setup comprises:
a configuration setup for various disc type selections comprising a DVD-ROM inspection and a CD-ROM inspection.

8. The disc inspection system according to claim 7, wherein:
the DVD-ROM inspection comprises various levels of an inspection criterion; and
the CD-ROM inspection comprises various levels of an inspection criterion, which may be different from the DVD-ROM inspection criterion.

9. The disc inspection system according to claim 1, wherein the display further comprises:
a history display for indicating past inspection results.

10. The disc inspection system according to claim 9, wherein the history display further comprises:
summarized statistics for the past inspections; and
statistics specific for an individual disc's inspection.

11. The disc inspection system according to claim 1, wherein the display further comprises:
a graphic that pictorially illustrates where defects are located on a disc.

12. The disc inspection system according to claim 11, wherein the graphic pictorially illustrates defects that are based on a criteria of more than one cylinder read failure.

13. A method for inspecting an optical disc, comprising:
entering process parameters and criteria at an input device;
storing process parameters in a main controller;
inserting a disc into an inspection station;
reading a disc cylinder according to a criteria;
determining if a fault is detected;
if a fault is detected, then
  if a criteria is exceeded based on the detected fault, then removing the disc from the inspection station as a bad disc;
  if a criteria is not exceeded, then incrementing a fault count and continuing the method;
determine if all cylinders determined by the criteria have been read;
if all cylinders have been read, then removing the disc from the inspection station as a good disc; and
if all cylinders have not been read, then repeating the method steps of reading a disc, determining if a fault is detected, and determining if all cylinders have been read.

14. The method for inspecting a disc according to claim 13, further comprising:
displaying a status for one or more inspection drives on a display.

15. The method for inspecting a disc according to claim 13, wherein the entering of process parameters and criteria at an input device further comprises:
entering information relating to at least one of an inspection setup, a defect setup, and a change of password.

16. The method for inspecting a disc according to claim 15, wherein the process of entering information of an inspection setup further comprises:
entering information specific to a type of operation to be performed based on a type of inspection comprising a DVD-ROM inspection and a CD-ROM inspection.

17. The method for inspecting a disc according to claim 13, further comprising the step of:
displaying a history of discs that have been inspected.

18. The method for inspecting a disc according to claim 13, further comprising the step of:
displaying a pictorial representation of a disc where defects are shown on the pictorial representation in a relative position to where defects on the actual disc being inspected are located.

19. A method for inspecting a disc, according to claim 13, further comprising:
determining a type of disc inserted into an inspection station, wherein the reading of a disc cylinder takes place according to a criteria that differs depending on the type of disc.

20. A method for repairing a damaged optical disc, comprising:
providing a predetermined criteria for repair to a repair station controller;
inserting a disc into a station input tray;
closing the station input tray;
mounting the disc on a disc holding assembly using the station controller;
moving the disc holding assembly into a position for a repair operation using the station controller;
rotating a brush that is in contact with the disc during the repair operation, and rotating the disc as well, where the speed of rotation of the brush and the disc is controlled by the station controller using the predetermined criteria;
providing a fluid to the brush before or during the repair operation;
moving the rotating brush over the disc during the repair operation along an axis that is parallel to the disc radius in a back and forth manner;
ending the repair operation by the station controller based on the predetermined criteria;
moving the disc holding assembly into the station input tray;
extending the station input tray; and
removing the disc from the-station input tray.

21. A method for repairing a damaged optical disc, comprising:
providing a polish station predetermined criteria for inspection to a polish station controller;
inserting a disc into a polish station input tray;
closing the polish station input tray;
mounting the disc on a polish station disc holding assembly using the polish station controller;
moving the polish station disc holding assembly into a position for a polishing operation using the polish station controller;
rotating a polish station brush that is in contact with the disc during the polishing operation, and rotating the disc as well, where the speed of rotation of the polish station brush and the disc is controlled by the polish station controller using the polish station predetermined criteria;
providing a fluid to the polish station brush before or during the polishing operation;
moving the rotating brush over the disc during the polishing operation along an axis that is parallel to the disc radius in a back and forth manner;
ending the polishing operation by the station controller based on the polish station predetermined criteria;
moving the polish station disc holding assembly into the polish station input tray;
extending the polish station input tray;
removing the disc from the polish station input tray;
providing a rejuvenate station predetermined criteria for inspection to a rejuvenate station controller;
inserting a disc into a rejuvenate station input tray;
closing the rejuvenate station input tray;
mounting the disc on a rejuvenate station disc holding assembly using the rejuvenate station controller;
moving the rejuvenate station disc holding assembly into a position for a rejuvenating operation using the rejuvenate station controller;
rotating a rejuvenate station brush that is in contact with the disc during the rejuvenating operation, and rotating the disc as well, where the speed of rotation of the rejuvenate station brush and the disc is controlled by the rejuvenate station controller using the rejuvenate station predetermined criteria;

providing a fluid to the rejuvenate station brush before or during the rejuvenating operation;

moving the rotating brush over the disc during the rejuvenating operation along an axis that is parallel to the disc radius in a back and forth manner;

ending the rejuvenating operation by the station controller based on the rejuvenate station predetermined criteria;

moving the rejuvenate station disc holding assembly into the rejuvenate station input tray;

extending the rejuvenate station input tray; and removing the disc from the rejuvenate station input tray.

22. The method for repairing a damaged disc according to claim 20, wherein mounting the disc on a disc holding assembly further comprises:

providing a holding hub on the disc holding assembly;

lowering the disc holding assembly over the disc so that a narrow portion of the holding hub extends through the hole in the disc and until the disc top surface contacts a wide portion bottom surface; and moving a pin in the holding hub in a direction from the wide portion to the narrow portion so that a tapered end of the pin closest to the narrow portion forces ball bearings in holes of a circumferential groove in the narrow portion in a radially outward direction, thereby forcing an 0-ring to expand and hold the disc firmly against the hub wide portion bottom surface and against the disc holding platter.

23. The method for repairing a damaged disc according to claim 22, further comprising:

providing a disc ejector mechanism on the disc holding assembly;

moving a pin in the holding hub in a direction from the narrow portion to the wide portion so that the tapered end of the pin closest to the narrow portion withdraws the force against the ball bearings, thereby causing the 0-ring to contract and thus releasing the disc from the hub wide portion bottom surface and the disc holding platter; and forcing the disc away from the disc holding platter with the disc ejector mechanism.

24. The method for repairing a damaged disc according to claim 23, wherein the disc ejector mechanism is a ring of compressible material mounted on the disc holding assembly.

25. The method for repairing a damaged optical disc according to claim 20, wherein the fluid is provided to the brush at a predefined interval.

26. An optical disc integrated inspection and repair system, comprising:

a main controller;

a user display connected to the main controller for displaying status information;

a user input device connected to the main controller for entering information including system configuration variables into the main controller;

an inspection system having a disc inspection station that has a drive input tray to receive a disc to be inspected, the inspection station being configured to check a track integrity and the track being chosen by a predetermined criterion, the inspection station being configured to determine a type of disc and make an appropriate inspection that is dependent on the type of disc, and the inspection system being connected with the main controller for receiving the predetermined inspection criterion and to provide some indication of results of an inspection; and a repair system, comprising at least one repair station that comprises:

a repair station input tray for inserting a disc into the repair station;

a disc holding assembly for securely holding the disc during a repair operation;

a disc movement motor that moves the disc in the disc holding assembly in a position for the repair operation;

a rotating brush that contacts the disc during the repair operation;

a fluid pump that delivers fluid to the rotating brush prior to or during the repair operation; and a repair station controller that controls the repair station input tray, the disc holding assembly, the disc movement motor, the rotating brush, and the fluid pump.

27. A method for inspecting and repairing an optical disc, comprising:

entering process parameters and criteria at an input device;

storing process parameters in a main controller;

inserting a disc into an inspection station;

reading a disc cylinder according to a criteria;

determining if a fault is detected;

if a fault is detected, then
    if a criteria is exceeded based on the detected fault, then removing the disc from the inspection station as a bad disc;
    if the criteria is not exceeded, then incrementing a fault count and continuing the method;

determining if all cylinders determined by the criteria have been read;

if all cylinders have been read, the removing the disc from the inspection station as a good disc; and if all cylinders have not been read, then repeating the method steps of reading a disc, determining if a fault is detected, and determining if all cylinders have been read;

repairing a bad disc according to the following:

providing a predetermined criteria for repair to a repair station controller;

inserting the disc into a station input tray;

closing the station input tray;

mounting the disc on a disc holding assembly using the station controller;

moving the disc holding assembly into a position for a repair operation using the station controller;

rotating a brush that is in contact with the disc during the repair operation, and rotating the disc as well, where the speed of rotation of the brush and the disc is controlled by the station controller using the predetermined criteria;

providing a fluid to the brush before or during the repair operation;

moving the rotating brush over the disc during the repair operation along an axis that is parallel to the disc radius in a back and forth manner;

ending the repair operation by the station controller based on the predetermined criteria;

moving the disc holding assembly into the station input tray;

extending the station input tray; and removing the disc from the station input tray.

28. An integrated optical disc inspection and repair system, comprising:

a main controller:

a user display connected to the main controller for displaying status information;

a user input device connected to the main controller for entering information including system configuration variables into the main controller;

an inspection system having a disc inspection station that is configured to determine if a disc requires repair according to a predefined criteria from the main controller, providing a disc inspection status on the user display;

repair system having a repair station attached to the inspection station that receives a disc requiring repair and is configured to perform a repair operation on the disc requiring repair;

disc holding devices upon which one or more discs are loaded for inspection and storing; and a disc handling system for moving discs to and from the disc holding devices and at least one of the inspection system and the repair system.

29. The integrated optical disc inspection and repair system according to claim 28, wherein the disc handling system further comprises:

disc carrying assembly for physically moving discs in the system;

a vertical drive for positioning the disc carrying assembly in a vertical direction;

a disc holding device positioning drive for positioning the disc to any of the disc holding devices, to the inspection station, or to the repair station;

wherein the vertical drive and the disc holding positioning drive are controlled by the main controller.

30. The integrated optical disc inspection and repair system according to claim 28, wherein the disc holding devices comprise at least two spindle assemblies having spindles upon which discs are lowered through their holes.

31. The integrated optical disc inspection and repair system according to claim 30, wherein the disc holding devices comprise:

an input spindle assembly;

a holding spindle assembly;

one or more good disc spindle assemblies where discs that are inspected and determined as being good are placed, with a different good disc spindle assembly for each type of disc; and one or more bad disc spindle assemblies where discs that are inspected and determined as being bad after one or more repair operations are placed, with a different bad disc spindle assembly for each type of disc.

32. The integrated optical disc inspection and repair system according to claim 30, wherein the spindle assemblies each further comprise:

a spindle disc base mount for affixing the spindle assembly to a fixed surface;

a spindle base that sits on top of the base mount; and a spindle disc support that sits on top of the spindle base and is used to directly support the disc.

33. The integrated optical disc inspection and repair system according to claim 32, wherein the spindle disc support is angled with respect to the base to help prevent discs from sticking together when lifted by the disc carrying assembly.

34. The integrated optical disc inspection and repair system according to claim 31, wherein the input spindle assembly further comprises an offset configured to force an unwanted disk to become separated from a wanted disc when moving the wanted disc off of the spindle.

35. The integrated optical disc inspection and repair system according to claim 29, further comprising:

a vacuum system for picking up discs with the disc carrying assembly; and wherein the disc carrying assembly further comprises:

a disc centering mechanism, the disc centering mechanism further comprising:

a rotatable arm that rotates the centering mechanism about a rotatable arm pivot out of the way when the disc carrying assembly is lowered onto a spindle;

a disc centering pin having a tapered head and a back stop that is positioned through a hole in the rotatable arm, the pin being configured to be in a downward extended position in the absence of force from a spindle, held into place by the back stop and configured to move initially in a vertical direction when a force is applied until a top side of the tapered head contacts a bottom side of the rotatable arm, and then rotating about the rotatable arm pivot after the force is applied for a continued distance.

36. A method for inspecting and repairing an optical disc according to claim 26, further comprising:

loading discs to be checked at an input disc holding device;

moving a disc from the input disc holding device to an inspection disc drive of the inspection system using a robotic arm assembly;

moving the disc from the inspection disc drive with the robotic arm assembly to either an input tray of the repair system after performing an inspection or to an output disc holding device depending on results of the inspection; and moving the disc from the input tray of the repair system with the robotic arm assembly to the inspection disc drive.

37. The method for inspecting and repairing an optical disc according to claim 31, further comprising:

separating discs that are stuck together by moving the discs past an offset having a groove just larger than a disc thickness that forces a bottom unwanted disc to slide sideways and become un-stuck to a top desired disc.

* * * * *